(12) United States Patent
Ghafourifar et al.

(10) Patent No.: US 10,761,910 B2
(45) Date of Patent: *Sep. 1, 2020

(54) APPLICATION PROGRAM INTERFACE ANALYZER FOR A UNIVERSAL INTERACTION PLATFORM

(71) Applicant: Entefy Inc., Palo Alto, CA (US)

(72) Inventors: Alston Ghafourifar, Los Altos Hills, CA (US); Philip Nathan Greenberg, San Diego, CA (US); Neil Achtman, Mountain View, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,944

(22) Filed: Jul. 15, 2019

(65) Prior Publication Data

US 2020/0050502 A1 Feb. 13, 2020

Related U.S. Application Data

(63) Continuation of application No. 14/986,157, filed on Dec. 31, 2015, now Pat. No. 10,353,754, which is a
(Continued)

(51) Int. Cl.
*G06F 16/20* (2019.01)
*G06F 9/54* (2006.01)
(Continued)

(52) U.S. Cl.
CPC ............ *G06F 9/543* (2013.01); *G06F 9/5027* (2013.01); *G06F 9/541* (2013.01); *G06F 40/40* (2020.01); *G06F 2209/5015* (2013.01)

(58) Field of Classification Search
CPC ........ G06F 9/543; G06F 40/40; G06F 9/5027; G06F 9/541; G06F 2209/5015
See application file for complete search history.

(56) References Cited

U.S. PATENT DOCUMENTS 5,481,597 A 1/1996 Given
5,951,638 A 9/1999 Hoss
(Continued)

FOREIGN PATENT DOCUMENTS

WO 9931575 6/1999
WO 2013112570 A1 8/2013

OTHER PUBLICATIONS

Guangyi Xiao et al., "User Interoperability With Heterogeneous IoT Devices Through Transformation," pp. 1486-1496, 2014.
(Continued)

*Primary Examiner* — Doon Y Chow
*Assistant Examiner* — Abdou K Seye
(74) *Attorney, Agent, or Firm* — Haynes and Boone, LLP

(57) ABSTRACT

An application program interface (API) analyzer that determines protocols and formats to interact with a service provider or smart device. The API analyzer identifies an API endpoint or websites for the service provider or smart device, determines a service category or device category, selects a category-specific corpus, forms a service-specific or device-specific corpus by appending information regarding the service provider or smart device to the category-specific corpus, and parses API documentation or the websites.

20 Claims, 21 Drawing Sheets

Related U.S. Application Data continuation of application No. 14/986,111, filed on Dec. 31, 2015, now Pat. No. 10,135,764.

(51) Int. Cl.
  *G06F 9/50* (2006.01)
  *G06F 40/40* (2020.01)

(56) References Cited

U.S. PATENT DOCUMENTS

| | | |
|---|---|---|
| 6,101,320 A | 8/2000 | Schuetze |
| 6,950,502 B1 | 9/2005 | Jenkins |
| 7,450,937 B1 | 11/2008 | Claudatos |
| 7,673,327 B1 | 3/2010 | Polis |
| 7,680,752 B1 | 3/2010 | Clune, III |
| 7,886,000 B1 | 2/2011 | Polis |
| 7,908,647 B1 | 3/2011 | Polis |
| 8,090,787 B2 | 1/2012 | Polis |
| 8,095,592 B2 | 1/2012 | Polis |
| 8,108,460 B2 | 1/2012 | Polis |
| 8,112,476 B2 | 2/2012 | Polis |
| 8,122,080 B2 | 2/2012 | Polis |
| 8,156,183 B2 | 4/2012 | Polis |
| 8,281,125 B1 | 10/2012 | Briceno |
| 8,296,360 B2 | 10/2012 | Polis |
| 8,433,705 B1 | 4/2013 | Dredze |
| 8,438,223 B2 | 5/2013 | Polis |
| 8,458,256 B2 | 6/2013 | Polis |
| 8,458,292 B2 | 6/2013 | Polis |
| 8,458,347 B2 | 6/2013 | Polis |
| 8,468,202 B2 | 6/2013 | Polis |
| 8,527,525 B2 | 9/2013 | Fong |
| 8,954,988 B1 | 2/2015 | Laredo |
| 8,959,156 B2 | 2/2015 | Polis |
| 9,529,522 B1 | 12/2016 | Barros |
| 2002/0133509 A1 | 9/2002 | Johnston |
| 2002/0152091 A1 | 10/2002 | Nagaoka |
| 2002/0178000 A1 | 11/2002 | Aktas |
| 2002/0194322 A1 | 12/2002 | Nagata |
| 2004/0117507 A1 | 6/2004 | Torma |
| 2004/0137884 A1 | 7/2004 | Engstrom |
| 2004/0243719 A1 | 12/2004 | Roselinsky |
| 2004/0266411 A1 | 12/2004 | Galicia |
| 2005/0015443 A1 | 1/2005 | Levine |
| 2005/0080857 A1 | 4/2005 | Kirsch |
| 2005/0198159 A1 | 9/2005 | Kirsch |
| 2006/0041423 A1 | 2/2006 | Kline |
| 2006/0193450 A1 | 8/2006 | Flynt |
| 2007/0054676 A1 | 3/2007 | Duan |
| 2007/0073816 A1 | 3/2007 | Kumar |
| 2007/0116195 A1 | 5/2007 | Thompson |
| 2007/0130273 A1 | 6/2007 | Huynh |
| 2007/0237135 A1 | 10/2007 | Trevallyn-Jones |
| 2007/0299796 A1 | 12/2007 | MacBeth |
| 2008/0062133 A1 | 3/2008 | Wolf |
| 2008/0088428 A1 | 4/2008 | Pitre |
| 2008/0112546 A1 | 5/2008 | Fletcher |
| 2008/0236103 A1 | 10/2008 | Lowder |
| 2008/0261569 A1 | 10/2008 | Britt |
| 2009/0016504 A1 | 1/2009 | Mantell |
| 2009/0119370 A1 | 5/2009 | Stern |
| 2009/0177477 A1 | 7/2009 | Nenov |
| 2009/0177484 A1 | 7/2009 | Davis |
| 2009/0177744 A1 | 7/2009 | Marlow |
| 2009/0181702 A1 | 7/2009 | Vargas |
| 2009/0271486 A1 | 10/2009 | Ligh |
| 2009/0292814 A1 | 11/2009 | Ting |
| 2009/0299996 A1 | 12/2009 | Yu |
| 2010/0057872 A1 | 3/2010 | Koons |
| 2010/0210291 A1 | 8/2010 | Lauer |
| 2010/0220585 A1 | 9/2010 | Poulson |
| 2010/0223341 A1 | 9/2010 | Manolescu |
| 2010/0229107 A1 | 9/2010 | Turner |
| 2010/0250578 A1 | 9/2010 | Athsani |
| 2010/0312644 A1 | 12/2010 | Borgs |
| 2010/0323728 A1 | 12/2010 | Gould |
| 2010/0325227 A1 | 12/2010 | Novy |
| 2010/0332217 A1* | 12/2010 | Wintner ............... G06F 40/253 704/9 |
| 2011/0010182 A1 | 1/2011 | Turski |
| 2011/0051913 A1 | 3/2011 | Kesler |
| 2011/0078247 A1 | 3/2011 | Jackson |
| 2011/0078256 A1 | 3/2011 | Wang |
| 2011/0078267 A1 | 3/2011 | Lee |
| 2011/0130168 A1 | 6/2011 | Vendrow |
| 2011/0194629 A1 | 8/2011 | Bekanich |
| 2011/0219008 A1 | 9/2011 | Been |
| 2011/0265010 A1 | 10/2011 | Ferguson |
| 2011/0276640 A1 | 11/2011 | Jesse |
| 2011/0279458 A1 | 11/2011 | Gnanasambandam |
| 2011/0295851 A1 | 12/2011 | El-Saban |
| 2012/0016858 A1 | 1/2012 | Rathod |
| 2012/0209847 A1 | 8/2012 | Rangan |
| 2012/0210253 A1 | 8/2012 | Luna |
| 2012/0221962 A1 | 8/2012 | Lew |
| 2012/0291072 A1* | 11/2012 | Maddison ........... G06F 16/9537 725/53 |
| 2013/0018945 A1 | 1/2013 | Vendrow |
| 2013/0024521 A1 | 1/2013 | Pocklington |
| 2013/0067345 A1 | 3/2013 | Das |
| 2013/0097279 A1 | 4/2013 | Polis |
| 2013/0111487 A1 | 5/2013 | Cheyer |
| 2013/0127864 A1 | 5/2013 | Nevin, III |
| 2013/0151508 A1 | 6/2013 | Kurabayashi |
| 2013/0197915 A1 | 8/2013 | Burke |
| 2013/0262385 A1 | 10/2013 | Kumarasamy |
| 2013/0262852 A1 | 10/2013 | Roeder |
| 2013/0267264 A1 | 10/2013 | Abuelsaad |
| 2013/0268516 A1 | 10/2013 | Chaudhri |
| 2013/0304830 A1 | 11/2013 | Olsen |
| 2013/0325343 A1 | 12/2013 | Blumenberg |
| 2013/0332308 A1 | 12/2013 | Linden |
| 2014/0020047 A1 | 1/2014 | Liebmann |
| 2014/0032538 A1 | 1/2014 | Arngren |
| 2014/0149399 A1 | 5/2014 | Kurzion |
| 2014/0270131 A1 | 9/2014 | Hand |
| 2014/0280460 A1 | 9/2014 | Nemer |
| 2014/0297807 A1 | 10/2014 | Dasgupta |
| 2015/0039887 A1 | 2/2015 | Kahol |
| 2015/0095127 A1 | 4/2015 | Patel |
| 2015/0149484 A1 | 5/2015 | Kelley |
| 2015/0186455 A1 | 7/2015 | Horling |
| 2015/0261496 A1 | 9/2015 | Faaborg |
| 2015/0278370 A1 | 10/2015 | Stratvert |
| 2015/0281184 A1 | 10/2015 | Cooley |
| 2015/0286747 A1 | 10/2015 | Anastasakos |
| 2015/0286943 A1 | 10/2015 | Wang |
| 2015/0339405 A1 | 11/2015 | Vora |
| 2016/0048548 A1 | 2/2016 | Thomas |
| 2016/0057207 A1 | 2/2016 | Li |
| 2016/0078030 A1 | 3/2016 | Brackett |
| 2016/0087944 A1 | 3/2016 | Downey |
| 2016/0092959 A1 | 3/2016 | Gross |
| 2016/0173578 A1 | 6/2016 | Sharma |
| 2016/0379136 A1 | 12/2016 | Chen |
| 2017/0039246 A1 | 2/2017 | Bastide |
| 2017/0039296 A1 | 2/2017 | Bastide |
| 2017/0206276 A1 | 7/2017 | Gill |
| 2017/0220963 A1 | 8/2017 | Canaran |
| 2017/0286155 A1 | 10/2017 | Hosabettu |
| 2017/0364587 A1 | 12/2017 | Krishnamurthy |
| 2018/0048661 A1 | 2/2018 | Bird |
| 2018/0101506 A1 | 4/2018 | Hodaei |

OTHER PUBLICATIONS

Marr, Bernard, Key Business Analytics, Feb. 2016, FT Publishing International, Ch. 17 "Neural Network Analysis" (Year: 2016).

* cited by examiner

Northbound Trains

| Zone | Stations | 309 | 211 | 313 | 215 | 217 | 319 | 221 | 323 | 225 | 227 | 329 | 231 | 233 | 135 |
|---|---|---|---|---|---|---|---|---|---|---|---|---|---|---|---|
| 6 | Gilroy | | | 7150 MONTEREY ST. | | 6:07 | | 6:28 | | | 7:05 | | | | |
| 6 | San Martin | | | GILROY 95020 | | 6:16 | | 6:37 | | | 7:14 | | | | |
| 6 | Morgan Hill | | | | | 6:22 | | 6:43 | | | 7:20 | | | | |
| 5 | Blossom Hill | | | | | 6:35 | | 6:56 | | | 7:33 | | | | |
| 5 | Capitol | | | | | 6:41 | | 7:02 | | | 7:39 | | | | |
| 4 | Tamien | 5:56 | — | | — | 6:49 | 6:56 | 7:10 | — | — | 7:47 | 7:56 | — | 8:33 | — |
| 4 | San Jose Diridon | 6:03 | 6:20 | | 6:50 | 6:57 | 7:03 | 7:18 | 7:45 | 7:50 | 7:55 | 8:03 | 8:20 | 8:40 | 9:15 |
| 4 | College Park | — | — | | — | — | — | — | — | — | 7:58 | — | — | — | — |
| 4 | Santa Clara | — | 6:25 | | — | 7:02 | — | 7:23 | — | — | 8:02 | — | 8:25 | 8:45 | 9:20 |
| 4 | Lawrence | — | 6:32 | | — | 7:12 | — | 7:28 | — | — | 8:12 | — | — | 8:50 | 9:25 |
| 3 | Sunnyvale | 6:13 | — | | 7:00 | 7:18 | 7:13 | 7:32 | — | 8:00 | 8:18 | 8:14 | 8:32 | 8:54 | 9:29 |
| 3 | Mountain View | — | 6:37 | | 7:05 | 7:23 | — | 7:37 | 7:57 | 8:05 | 8:23 | — | 8:37 | 9:00 | 9:34 |
| 3 | San Antonio | — | — | | — | 7:27 | — | — | — | — | 8:27 | — | — | 9:04 | 9:38 |
| 3 | California Ave | — | — | | 7:11 | 7:31 | — | — | — | 8:11 | 8:31 | — | — | 9:08 | 9:42 |
| 3 | Palo Alto | 6:23 | — | | 7:16 | 7:36 | 7:23 | 7:45 | 8:05 | 8:16 | 8:36 | 8:25 | — | 9:14 | 9:46 |
| 3 | Menlo Park | — | 6:45 | | — | 7:39 | — | 7:45 | — | — | 8:39 | — | 8:45 | 9:17 | 9:49 |
| 2 | Redwood City | 6:30 | 6:51 | | — | 7:45 | 7:30 | 7:51 | — | 8:24 | 8:45 | 8:33 | 8:51 | 9:23 | 9:54 |
| 2 | San Carlos | — | 6:55 | | 7:24 | — | — | 7:55 | — | — | — | — | 8:55 | 9:27 | 9:58 |
| 2 | Belmont | — | 6:58 | | — | — | — | 7:58 | — | — | — | — | 8:58 | 9:30 | 10:01 |
| 2 | Hillsdale | — | 7:02 | | 7:28 | 7:51 | — | 8:02 | 8:16 | 8:28 | 8:51 | — | 9:02 | 9:33 | 10:04 |

| Function | Method | Endpoint | Parameters |
|---|---|---|---|
| List products | GET | /v1/products | latitude |
| | | | longitude |
| Get price estimates | GET | /v1/estimates/price | start_latitude |
| | | | start_longitude |
| | | | end_latitude |
| | | | end_longitude |
| Get time estimates | GET | /v1/estimates/time | start_latitude |
| | | | start_longitude |
| | | | customer_uuid (optional) |
| | | | product_id (optional) |
| Create ride request | POST | /v1/requests | product_id |
| | | | start_latitude |
| | | | start_longitude |
| | | | end_latitude (optional) |
| | | | end_longitude (optional) |
| | | | surge_confirmation_id (optional) |

```
STATUS-CODE: 200 OK

{
  "PRODUCTS": [
    {
       "CAPACITY": 4,
       "DESCRIPTION": "THE LOW-COST UBER",
       "PRICE_DETAILS": {
          "DISTANCE_UNIT": "MILE",
          "COST_PER_MINUTE": 0.26,
          "SERVICE_FEES": [
             {
                "FEE": 1.0,
                "NAME": "SAFE RIDES FEE"
             }
          ],
          "MINIMUM": 5.0,
          "COST_PER_DISTANCE": 1.3,
          "BASE": 2.2,
          "CANCELLATION_FEE": 5.0,
          "CURRENCY_CODE": "USD"
       },
       "IMAGE": "HTTP://D1A3F4SPAZZRP4.CLOUDFRONT.NET/CAR.JPG",
       "DISPLAY_NAME": "CARX",
       "PRODUCT_ID": "A1111C8C-C720-46C3-8534-2FCDD730040D"
    },
    {
       "CAPACITY": 6,
       "DESCRIPTION": "LOW-COST RIDES FOR LARGE GROUPS",
       "PRICE_DETAILS": {
          "DISTANCE_UNIT": "MILE",
          "COST_PER_MINUTE": 0.45,
          "SERVICE_FEES": [
             {
                "FEE": 1.0,
                "NAME": "SAFE RIDES FEE"
             }
          ],
          "MINIMUM": 8.0,
          "COST_PER_DISTANCE": 2.15,
          "BASE": 5.0,
          "CANCELLATION_FEE": 5.0,
          "CURRENCY_CODE": "USD"
       },
       "IMAGE": "HTTP://D1A3F4SPAZZRP4.CLOUDFRONT.NET/CAR.JPG",
       "DISPLAY_NAME": "CARXL",
       "PRODUCT_ID": "821415D8-3BD5-4E27-9604-194E4359A449"
    }
  ]
}
```

*FIG. 6B*

| Metadata | | Example |
|---|---|---|
| access_token | | c.FmDPkzyzaQe... |
| client_version | | 17 |

| Data Values | Permission | Example |
|---|---|---|
| device_id | read | peyiJNo0lldT2YlIVtYaGQ |
| locale | read | en-US |
| software_version | read | 4.0 |
| structure_id | read | VqFabWH21nwVyd4... |
| name | read | Hallway (upstairs) |
| name_long | read | Hallway Thermostat (upstairs) |
| last_connection | read | 2015-12-31T23:59:59.000Z |
| is_online | read | TRUE |
| can_cool | read | TRUE |
| can_heat | read | TRUE |
| is_using_emergency_heat | read | TRUE |
| has_fan | read | TRUE |
| fan_timer_active | read | TRUE |
| fan_timer_timeout | read | 2015-12-31T23:59:59.000Z |
| has_leaf | read | FALSE |
| temperature_scale | read | F |
| target_temperature_f | read/write | 72 |
| target_temperature_c | read/write | 21.5 |
| target_temperature_high_f | read/write | 80 |
| target_temperature_high_c | read/write | 24.5 |
| target_temperature_low_f | read/write | 65 |
| target_temperature_low_c | read/write | 19.5 |
| away_temperature_high_f | read | 80 |
| away_temperature_high_c | read | 24.5 |
| away_temperature_low_f | read | 65 |
| away_temperature_low_c | read | 19.5 |
| hvac_mode | read/write | heat-cool |
| ambient_temperature_f | read | 72 |
| ambient_temperature_c | read | 21.5 |
| humidity | read | 35 |
| hvac_state | read | heating |
| where_id | read | d6reb_OZTM... |

*FIG. 7*

APPLICATION PROGRAM INTERFACE ANALYZER FOR A UNIVERSAL INTERACTION PLATFORM

CROSS REFERENCE TO RELATED APPLICATIONS

This application claims priority to, and is a continuation of, the commonly-assigned nonprovisional patent application having U.S. patent application Ser. No. 14/986,157, filed Dec. 31, 2015, entitled "Universal Interaction Platform for People, Services, and Devices," now Pat. Ser. No. 10/353,754, which claims priority to, and is a continuation of, the commonly-assigned nonprovisional patent application having U.S. patent application Ser. No. 14/986,111, filed Dec. 31, 2015, entitled "Universal Interaction Platform for People, Services, and Devices," now Pat. Ser. No. 10/135,764, both of which are hereby incorporated by reference in their entireties.

TECHNICAL FIELD

This disclosure relates generally to apparatuses, methods, and computer readable media for interacting with people, services, and devices across multiple communications formats and protocols.

BACKGROUND

A growing number of service providers allow users to request information or services from those service providers via a third party software applications. Additionally, a growing number of smart devices allow users to obtain information from and control those smart devices via a third party software application. Meanwhile, individuals communicate with each other using a variety of protocols such as email, text, social messaging, etc. In an increasingly chaotic digital world, it's becoming increasingly difficult for users to manage their digital interactions with service providers, smart devices, and individuals. A user may have separate software applications for requesting services from a number of service providers, for controlling a number of smart devices, and for communicating with individuals. Each of these separate software applications may have different user interfaces and barriers to entry.

The subject matter of the present disclosure is directed to overcoming, or at least reducing the effects of, one or more of the problems set forth above. To address these and other issues, techniques that enable seamless, multi-format, multi-protocol communications are described herein.

BRIEF DESCRIPTION OF THE DRAWINGS

FIGS. 5A and 5B are examples of publicly available information regarding a service provider that may be downloaded by the universal interaction platform, according to one or more disclosed embodiments.

FIG. 6A shows exemplary protocols and formats required to output an instruction to a service provider via an application program interface (API).

FIG. 6B shows an exemplary format of a response from a service provider.

FIG. 7 shows an exemplary format of an object sent to and from a smart device

DETAILED DESCRIPTION

Disclosed are apparatuses, methods, and computer readable media for integrating communications for computing devices across multiple formats and multiple protocols. More particularly, but not by way of limitation, this disclosure relates to apparatuses, methods, and computer readable media to permit computing devices, e.g., smartphones, tablets, laptops, wearables, and the like, to present users with a multi-protocol, multi-format inbox for communicating with people and service providers and for controlling devices via multiple formats and communication protocols.

Figure 1:
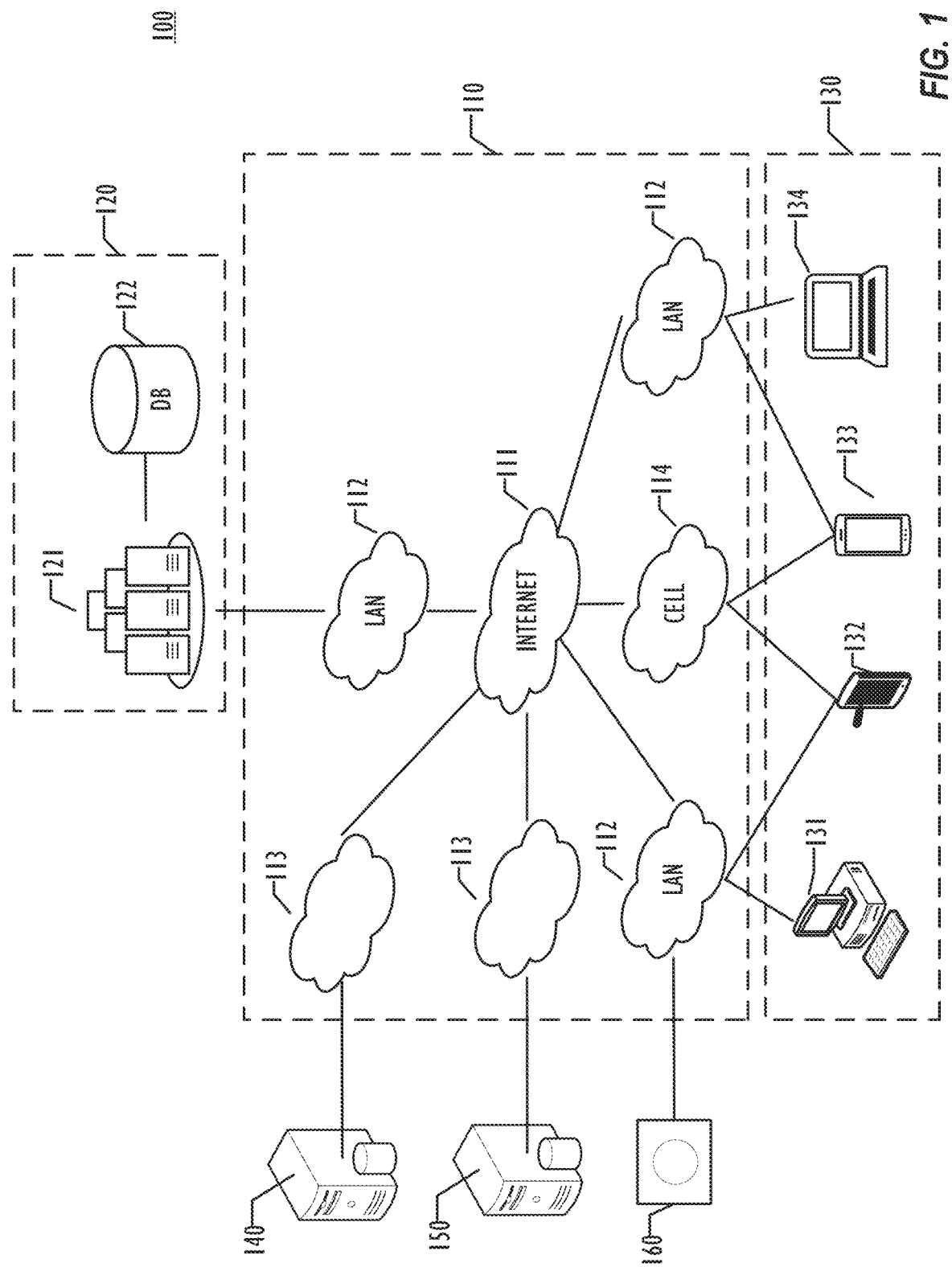
FIG. 1 is a block diagram illustrating a network architecture infrastructure according to one or more disclosed embodiments.

Referring now to FIG. 1, a network architecture infrastructure 100 is shown schematically. The infrastructure 100 includes computer networks 110, interaction platform devices 120, client devices 130, third party communications devices 140, third party service provider devices 150, and smart devices 160.

The computer networks 110 may include any communications network that allows computers to exchange data, such as the internet 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the interaction platform devices 120, the client devices 130, the third party communications devices 140, the third party service provider devices 150, and the smart devices 160) via hardware elements such as gateways and routers.

The interaction platform devices 120 may include one or more servers 121 and one or more storage devices 122. The one or more servers 121 may include any suitable computer hardware and software configured to provide the features disclosed herein. The storage devices 122 may include any tangible computer-readable storage media including, for example, read-only memory (ROM), random-access memory (RAM), magnetic disc storage media, optical storage media, solid state (e.g., flash) memory, etc.

The client devices 130 may include any number of computing devices that enable an end user to access the features disclosed herein. For example, the client devices 130 may include, for example, desktop computers 131, tablet computers 132, mobile phone 133, notebook computers 134, etc.

The third party communications devices 140 may include email servers such as a GOOGLE® or YAHOO! ® email server (GOOGLE is a registered service mark of Google Inc. YAHOO! is a registered service mark of Yahoo! Inc.), third party instant message servers such as a YAHOO! ° Messenger or AOL® Instant Messaging server (AOL is a registered service mark of AOL Inc.), third party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

The third party service devices 150 may include any number of computing devices that enable an end user to request one or more services via network communication.

The smart devices 160 may include any number of hardware devices that communicate via any of the computer networks 110 and are capable of being controlled via network communication.

As described in more detail below, the universal interaction platform allows users to interact with individuals, service providers, and smart devices 160 by sending a message (in the form of a message object) from a client device 130. The message object is output by the client device 130 for transmittal to the server 121. When the user is interacting with a service provider, the universal interaction platform formats an instruction for the third party service device 150 associated with the service provider and outputs the instruction from the server 121 for transmittal to the third party service device 150. Similarly, when the user is interacting with a smart device 160, the universal interaction platform formats an instruction for the smart device 160 and outputs the instruction from the server 121 for transmittal to the smart device 160. The server 121 may also receive a response from the third party service device 150 or smart device 160, format a response message (in the form of a response message object) for the user, and output the response message object for transmittal to the client device 130.

Figure 2A:
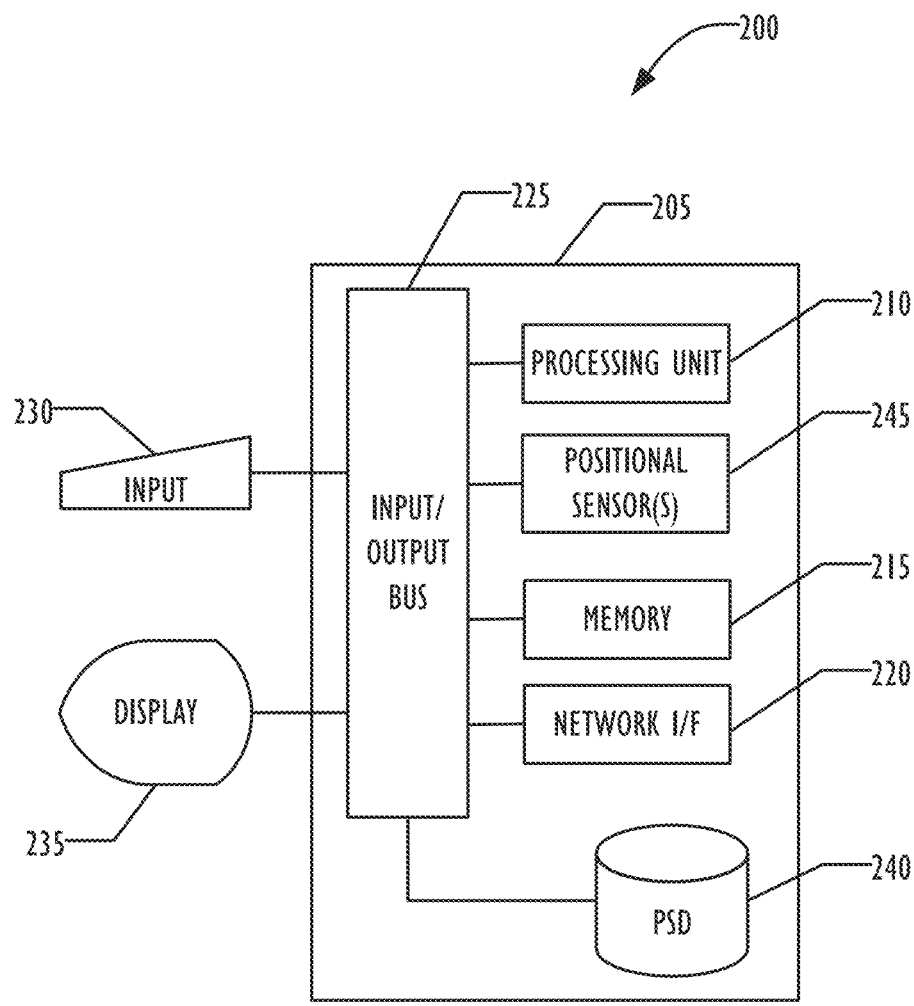
FIG. 2A is a block diagram illustrating a computer which could be used to execute the multi-format/multi-protocol communication approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a server 121 or a client device 130. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
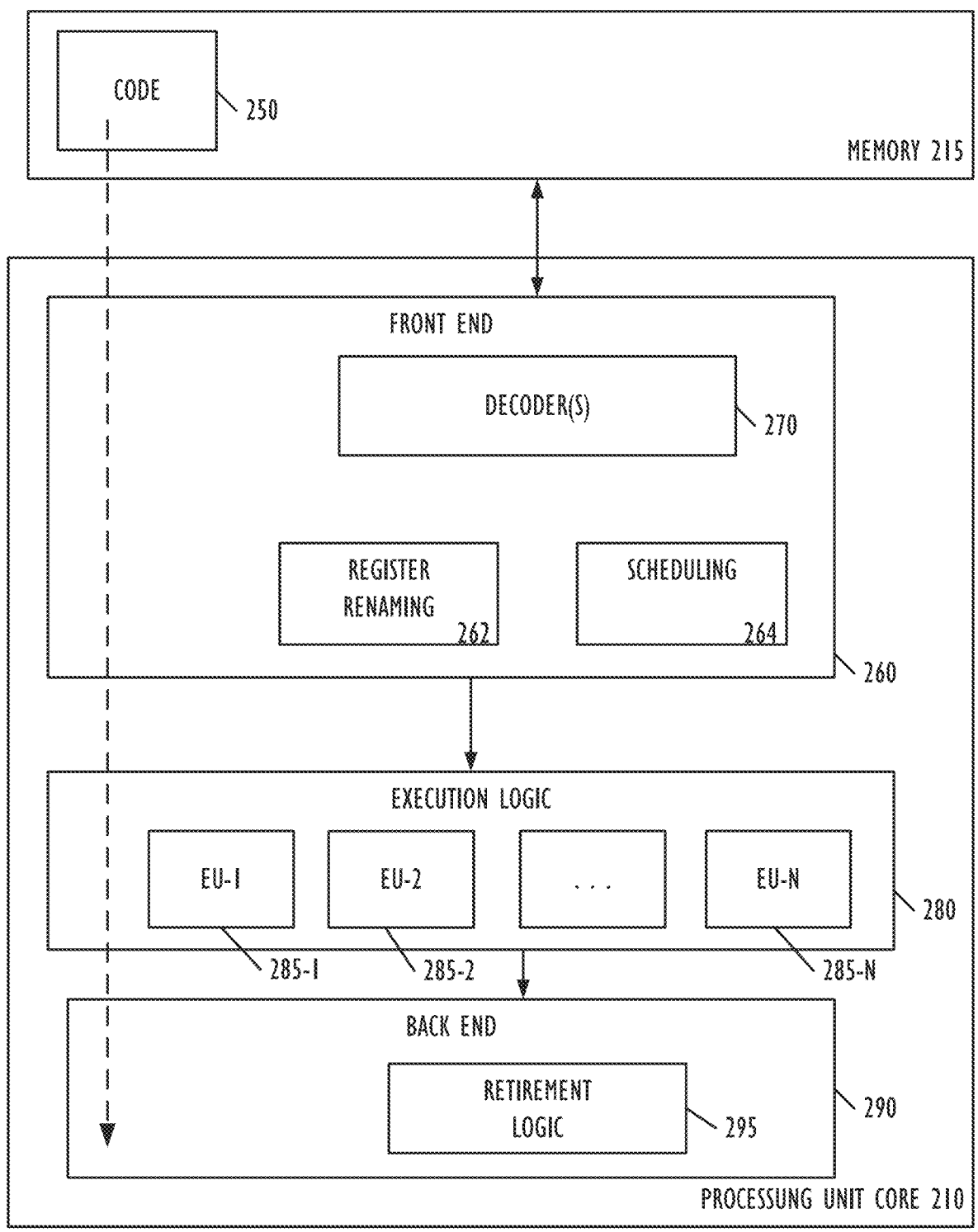
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Multi-protocol, Multi-format Inbox

Figure 3A:
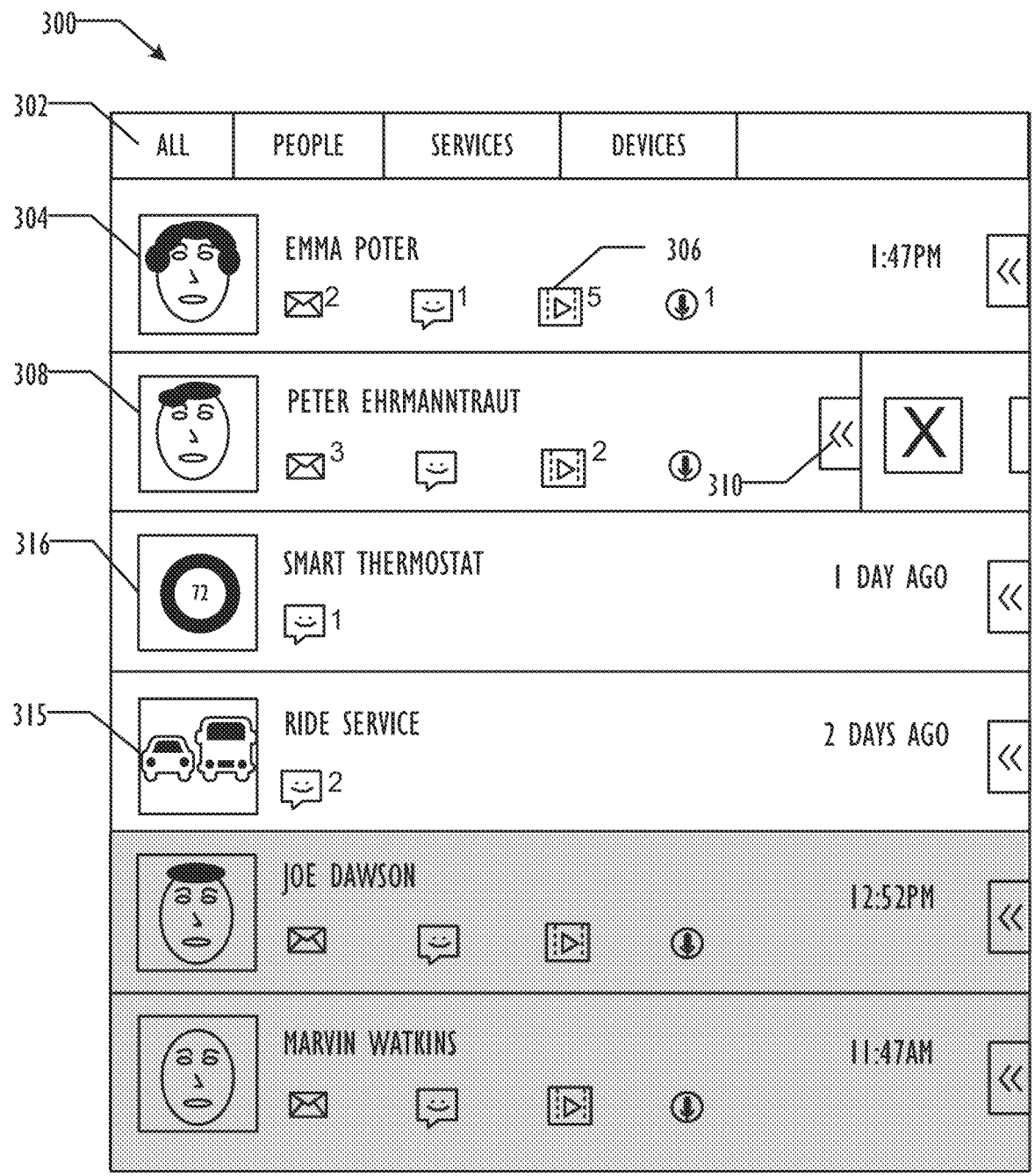
FIGS. 3A through 3G show examples of a multi-protocol, multi-format inbox, according to one or more disclosed embodiments.

FIG. 3A shows an example of a multi-protocol, person-centric, multi-format inbox 300, according to one or more disclosed embodiments. The inbox 300 shown in FIG. 3A may, for example, be displayed on the display of any of the client devices 130 such as a desktop computer 131, a tablet computer 132, a mobile phone 133, a notebook computer 134, or other computing device. In certain embodiments, elements of the inbox 300 may be interacted with by a user utilizing a touchscreen interface or any other suitable input interface.

The inbox 300 enables user to interact with people across multiple formats and multiple protocols (e.g., email, text, voice, video, social messaging, etc.) as described, for example, in U.S. patent application Ser. No. 14/141,551, filed Dec. 27, 2013; U.S. patent application Ser. No. 14/168,815, filed Jan. 30, 2014; U.S. patent application Ser. No. 14/461,967, filed Aug. 18, 2014; and U.S. patent application Ser. No. 14/579,712, filed Dec. 22, 2014. The disclosure of each of the foregoing patent applications (collectively referred to herein as "The Entefy personal communications patent applications") are hereby incorporated by reference. Each person is represented on a row. In the example of FIG. 3A, rows 304 and 308 represent people, specifically exemplary individuals 'Emma Poter' and 'Peter Ehrmanntraut.'

As is shown across the top row 302 of the inbox 300 also enables users to interact with service providers and devices via multiple formats and communication protocols. All messages may be combined together into a single, unified inbox, as is shown in FIG. 3A.

In the example of FIG. 3A, row 316 represents a smart device 160, for example a smart thermostat.

In the example of FIG. 3A, row 315 represents a service provider, for example an on-demand ride service.

Figure 3B:
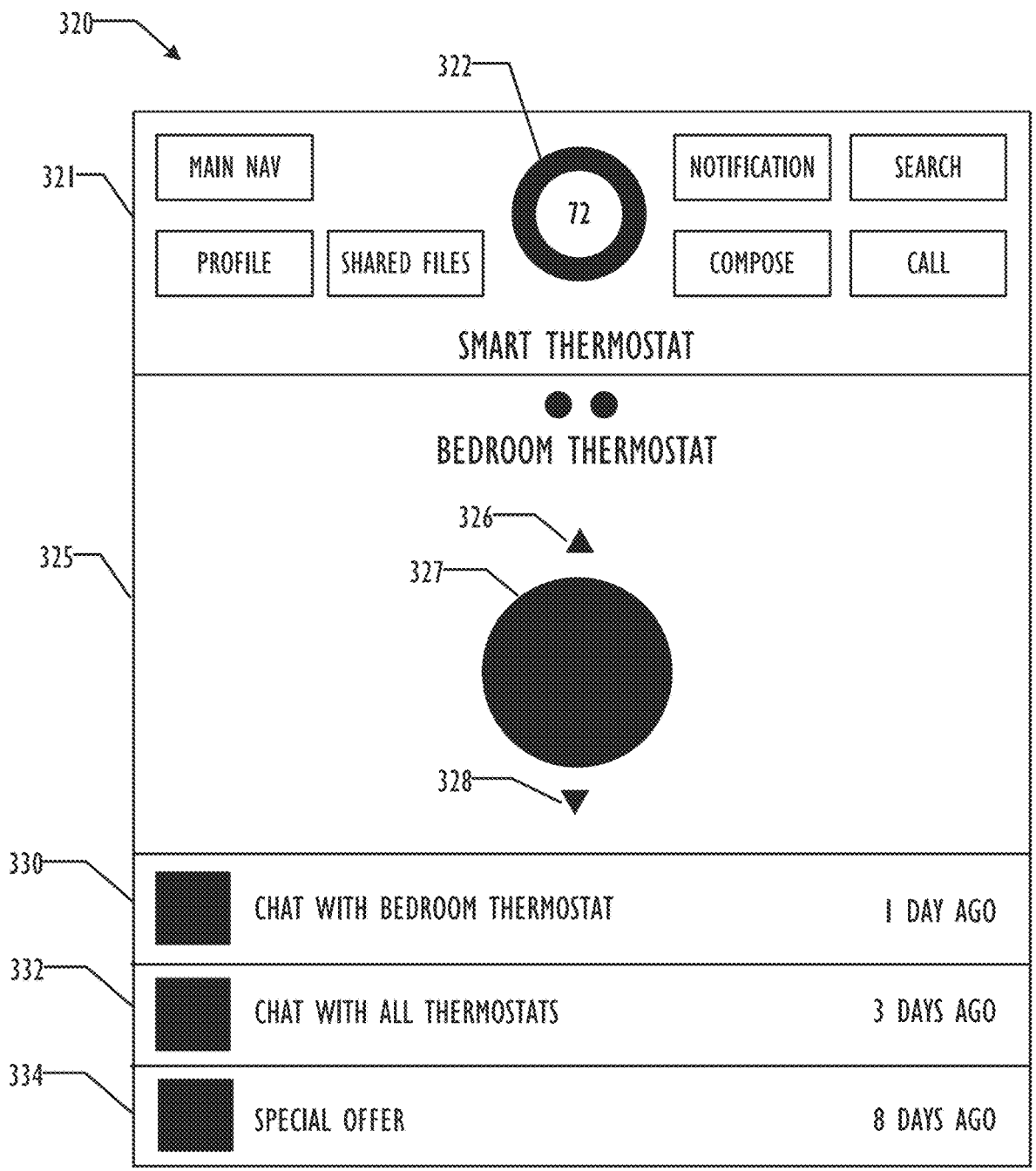

Referring now to FIG. 3B, an example of an interface 320 to interact with a particular smart device 160 is shown, according to one or more disclosed embodiments. The interface 320 is output to the user, for example, if the user selects row 316 of the interface 300.

The top portion 321 of the interface 320 includes a pictorial icon 322 and the name of the particular smart device 160 (in this example, a smart thermostat) as well as buttons to view and/or change settings related to the smart device 160. The interface 320 also includes a device interface 325 to control the smart device 160. In this instance, up arrow 326 increases the target temperature 327 of the smart thermostat and the down arrow 328 decreases the target temperature 327. As described in more detail below, the universal interaction platform allows a user to interact with the smart device 160 by sending messages to the smart device 160 using natural language. In the example shown in FIG. 3B, row 330 represents messages to and from one smart thermostat and row 332 represents messages to and from all of the user's smart thermostats. The universal interaction platform also allows a user to interact with a provider of the smart device 160. In the example shown in FIG. 3B, row 334 represents promotional messages from the provider of the smart thermostat.

Figure 3C:
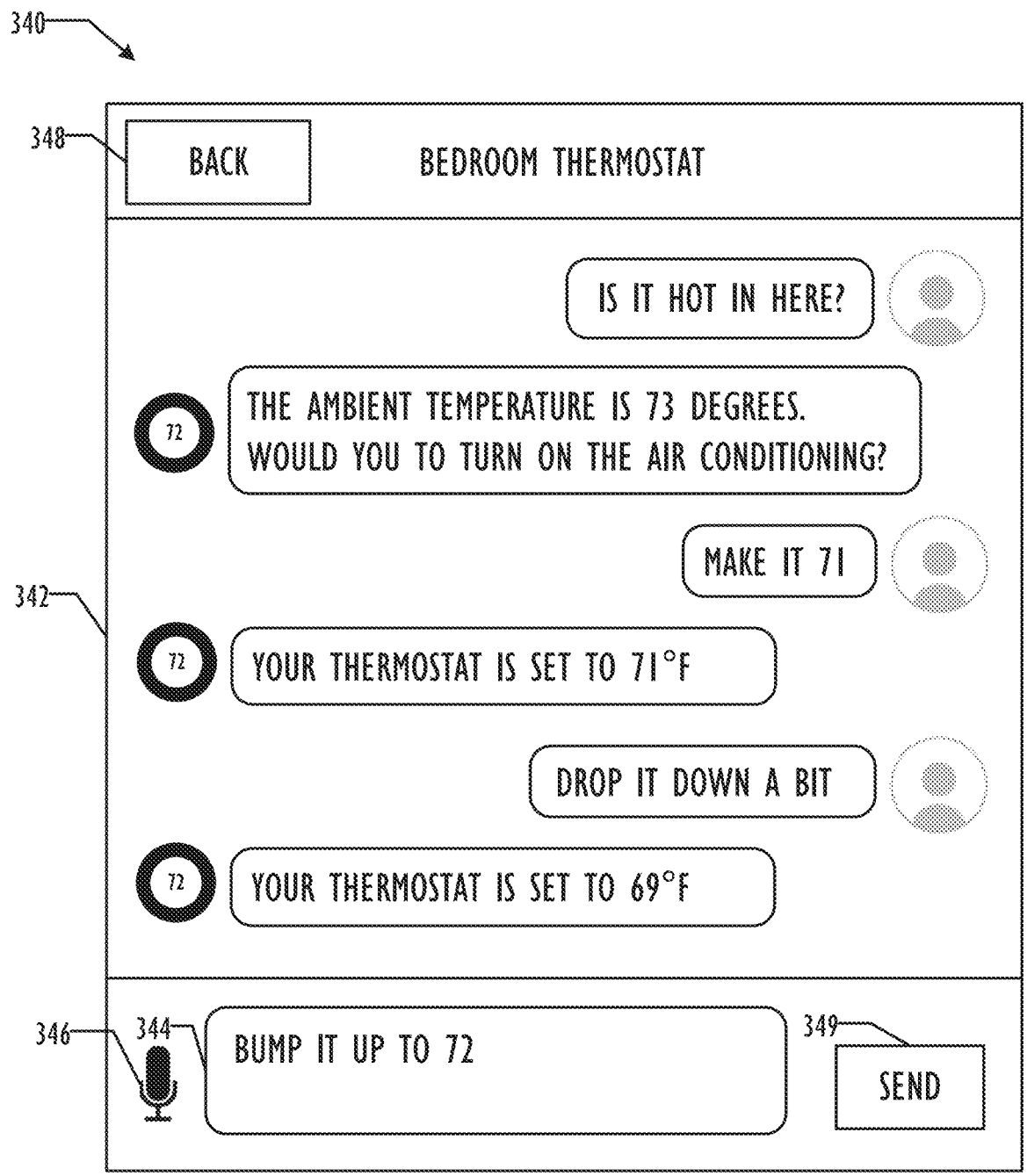

Referring now to FIG. 3C, an example of an interface 340 for messages to and from a particular smart device 160 is shown, according to one or more disclosed embodiments. The interface 340 is output to the user, for example, if the user selects row 330 of the interface 320.

As described in more detail below, the interface 340 allows users to interact with the smart device 160 by sending messages using natural language. The universal interaction platform also receives responses from the smart device 160, formats the responses in the form of messages for the user from the smart device 160, and outputs the messages to the user via the interface 340. The interface 340 includes message history 342 showing messages from the user to the smart device 160 and responses from the smart device 160 in the form of messages to the user from the smart device 160. Messages to the smart device 160 may include text (input, for example, by a keyboard or virtual 'on screen' keyboard output by a touchscreen) or sound (input, for example, by a microphone). The interface 340 may include a text entry box 344 and a microphone icon 346 to record sound or convert speech to text. A back button 348 may be used to return to the interface 320 and a send button 349 may be used to send the message to the smart device 160.

Figure 3D:
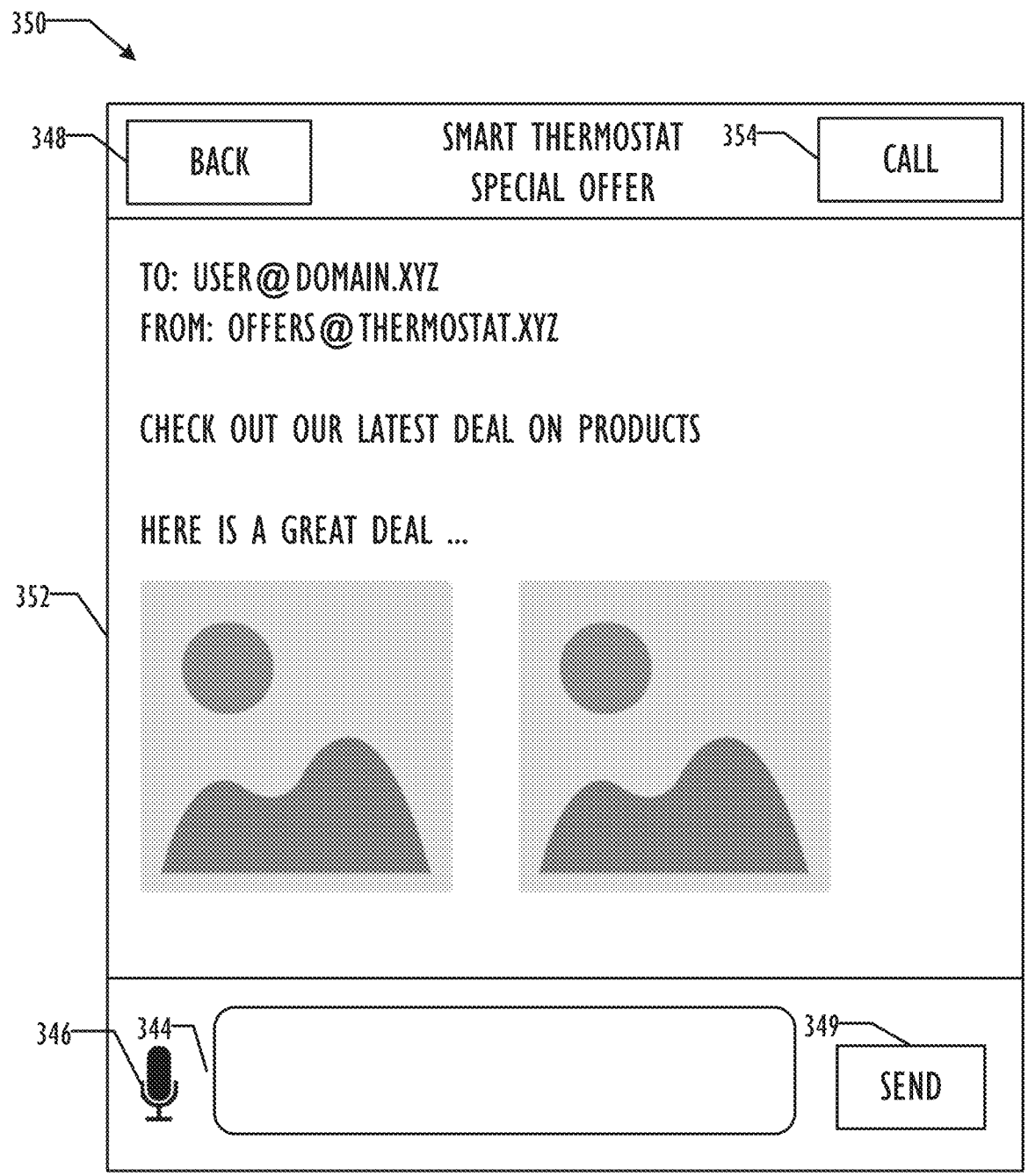

Referring now to FIG. 3D, an example of an interface 350 for promotional messages from the provider of a smart device 160 is shown, according to one or more disclosed embodiments. The interface 350 is output to the user, for example, if the user selects row 334 of the interface 320.

The interface 350 includes a message area 352 where messages from the provider of the smart device 160 are displayed to the user. The interface 350 may also include a call button 354 to place a telephone call to the provider of the smart device 160. Similar to the interface 340, the interface 350 may also include a text entry box 344 to enter text-based response to the provider of the smart device 160, a send button 349 to send the text-based response, a microphone icon 346 to record sound or convert speech to text, and a back button 348 to return to the interface 320.

Figure 3E:
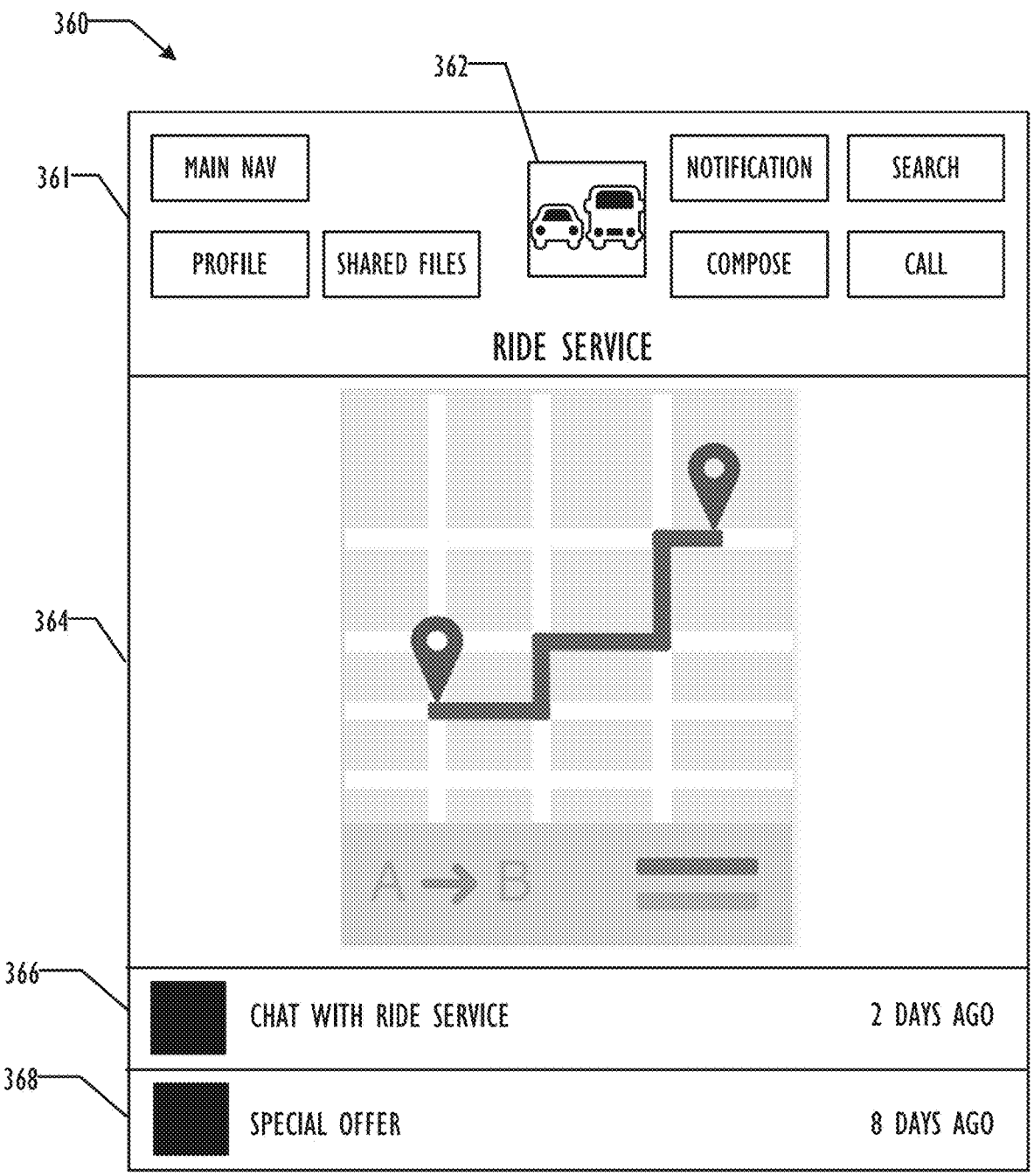

Referring now to FIG. 3E, an example of an interface 360 to interact with a particular service provider is shown, according to one or more disclosed embodiments. The interface 360 is output to the user, for example, if the user selects row 315 of the interface 300.

The top portion 361 of the interface 360 includes a pictorial icon 362 and the name of the particular service provider (in this example, a ride service) as well as buttons to view and/or change settings related to the service provider. The interface 360 also includes a service provider interface 362 to interact with the service provider. As described in more detail below, the universal interaction platform allows a user to request services from a service provider by sending messages using natural language. In the example shown in FIG. 3E, row 366 represents messages requesting services from the service provider and messages from the service provider regarding those services. In the example shown in FIG. 3E, row 368 represents promotional messages from the service provider.

Figure 3F:
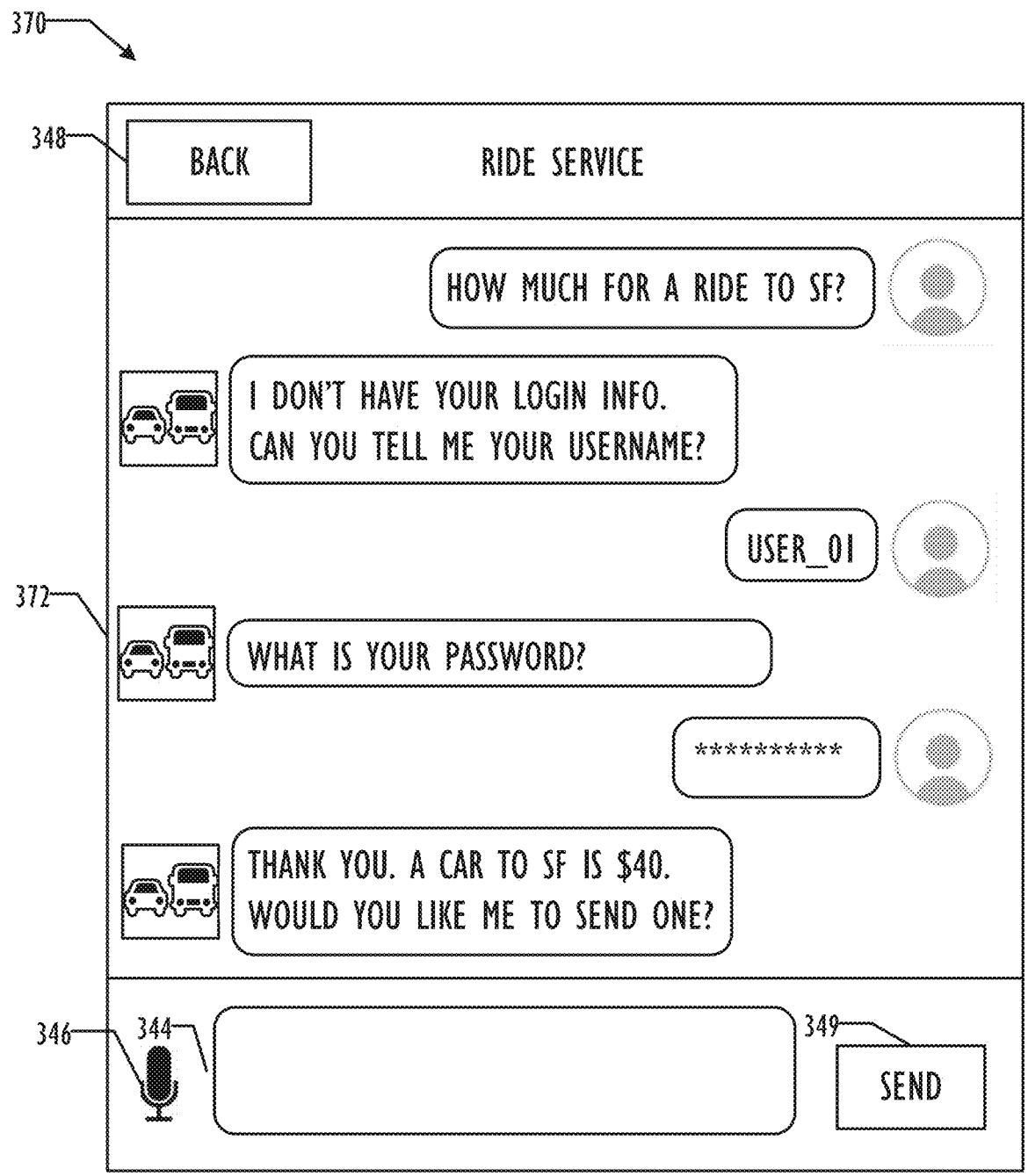

Referring now to FIG. 3F, an example of an interface 370 for messages to and from a particular service provider is shown, according to one or more disclosed embodiments. The interface 370 is output to the user, for example, if the user selects row 366 of the interface 360.

As described in more detail below, the interface 370 allows users to interact with the service provider by sending messages using natural language. The universal interaction platform also receives responses from the service provider, formats the responses in the form of messages for the user from the service provider, and outputs the messages to the user via the interface 370. The interface 370 includes message history 372 showing messages from the user to the service provider and responses from the service provider in the form of messages to the user from the smart device 160. Messages to the service provider may include text (input, for example, by a keyboard or virtual 'on screen' keyboard output by a touchscreen) or sound (input, for example, by a microphone). Similar to the interface 340, the interface 370 may include a text entry box 344 to enter text-based messages to the service provider, a microphone icon 346 to record sound or convert speech to text, a back button 348 to return to the interface 360 and a send button 349 to send the message to service provider. Each service provider may have more than one protocol for requesting services from that service provider and/or for outputting responses to service requests. For example, sending a message requesting a car may require outputting instructions to an API while the ride service may send responses by SMS and email. SMS messages may be received from more than one phone number. Email messages may be received from more than one email address (e.g., receipts@rideservice.xyz, support@rideservice.xyz, etc.). Regardless of protocol or format, the universal interaction platform described herein combines all messages to and from each service provider regarding service requests into a single interface 370.

Figure 3G:
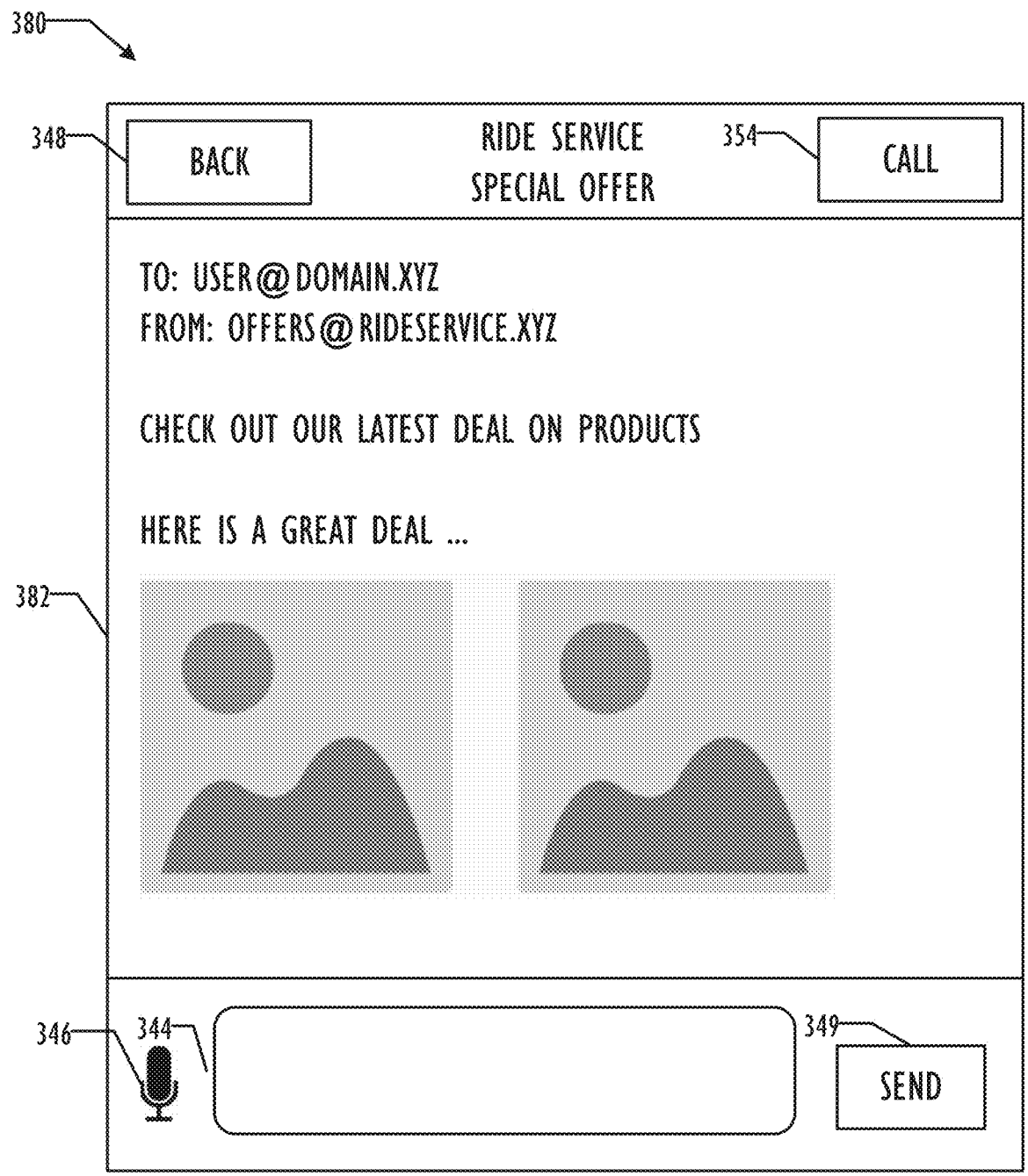

Referring now to FIG. 3G, an example of an interface 380 for promotional messages from a particular service provider is shown, according to one or more disclosed embodiments. The interface 380 is output to the user, for example, if the user selects row 368 of the interface 360.

Similar to the interface 350, the interface 380 includes a message area 352 where messages from the service provider are displayed to the user, a call button 354 to place a telephone call to the service provider, a text entry box 344 to enter text-based response to the service provider, a send button 349 to send the text-based response, a microphone icon 346 to record sound or convert speech to text, and a back button 348 to return to the interface 360.

Figure 4:
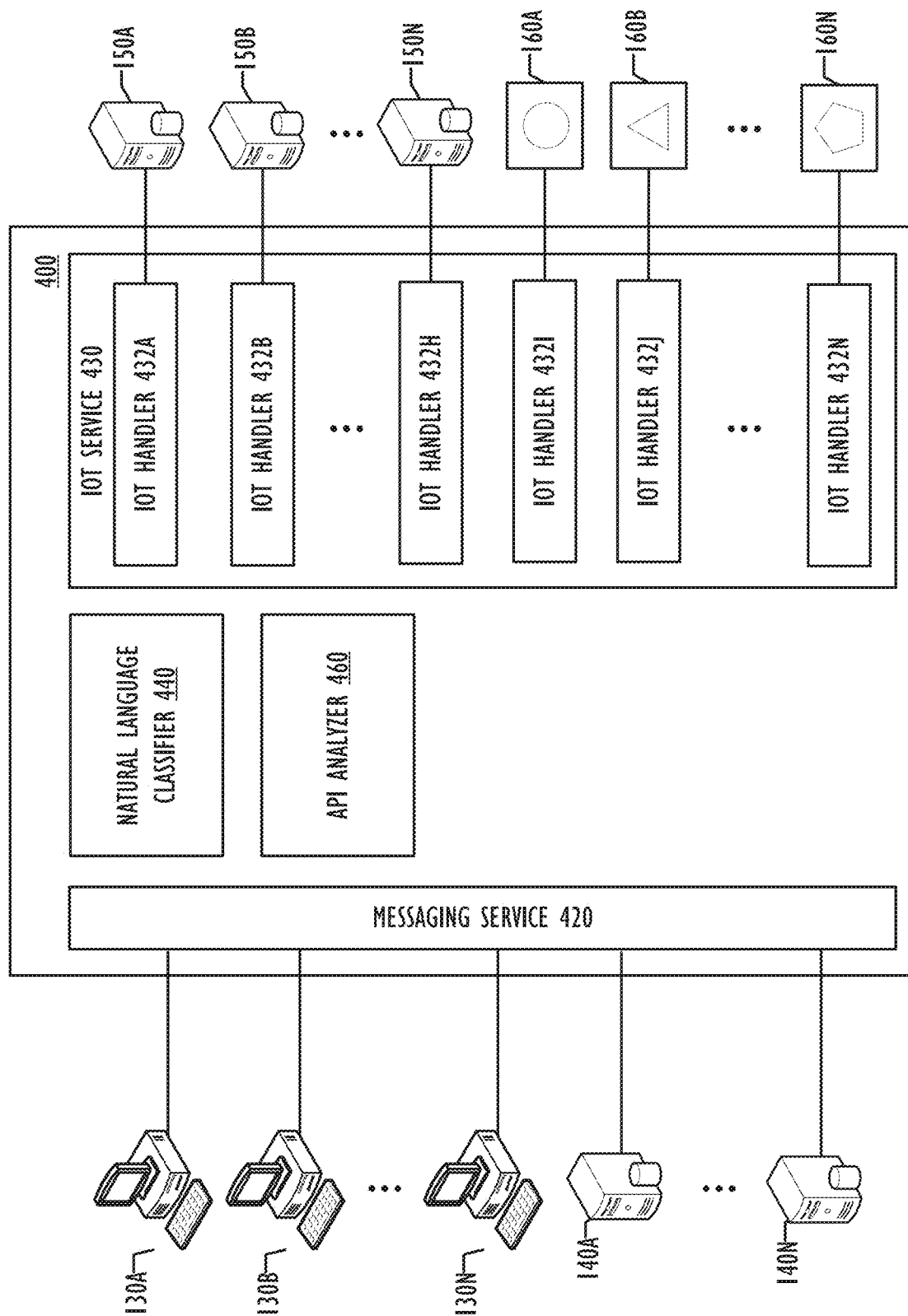
FIG. 4 is a block diagram of a universal interaction platform, according to one or more disclosed embodiments.

Referring now to FIG. 4, the universal interaction platform 400 is illustrated in further detail, according to one or more disclosed embodiments. The universal interaction platform 400 includes a messaging service 420, an IoT (Internet of Things) service 430, a natural language classifier 440, and an API analyzer 460. The IoT service 430 includes a number of IoT handlers 432. The messaging service 420, the IoT service 430, the IoT handlers 432, the natural language classifier 440, and the API analyzer 460 may be implemented as software modules stored on the storage device 122 and executed by the server 121.

The messaging service 420 sends and receives messages to and from the client devices 130 (via the inbox 300 and the interfaces 360, 380, etc. as described above). The messaging service 420 also communicates with the third party communications devices 140 as described, for example, in the Entefy personal communications patent applications, which are referenced above and incorporated by reference.

The IoT service 430 includes an IoT handler 432 for each service provider or smart device 160 supported by the universal interaction platform 400. Each IoT handler 432 may interact with a particular service provider or type (e.g., brand, model, etc.) of smart device 160. For example, IoT handler 432a may interact with the ride service described above while IoT handler 432i may interact with the smart thermostat described above.

The natural language classifier 440 is a machine learning tool that derives meaning from natural language by applying rules developed by analyzing a large corpora of real-world examples. As described in more detail below, the corpora may include publicly-available data sets as well as natural language documents collected by the universal interaction platform 400 such as messages output by users, descriptions of the services provided by the service providers, documentation regarding the services and the smart devices 160, etc.

The universal interaction platform 400 enables users to interact with smart devices 160 and service providers via the multi-protocol, multi-format inbox 300 illustrated in FIGS. 3A-3G.

In some instances, the universal interaction platform 400 obtains information regarding a service provider by downloading publicly-available information regarding the service provider and storing that information in a structured data set such that the universal interaction platform 400 is able to respond to user queries.

Figure 5B:
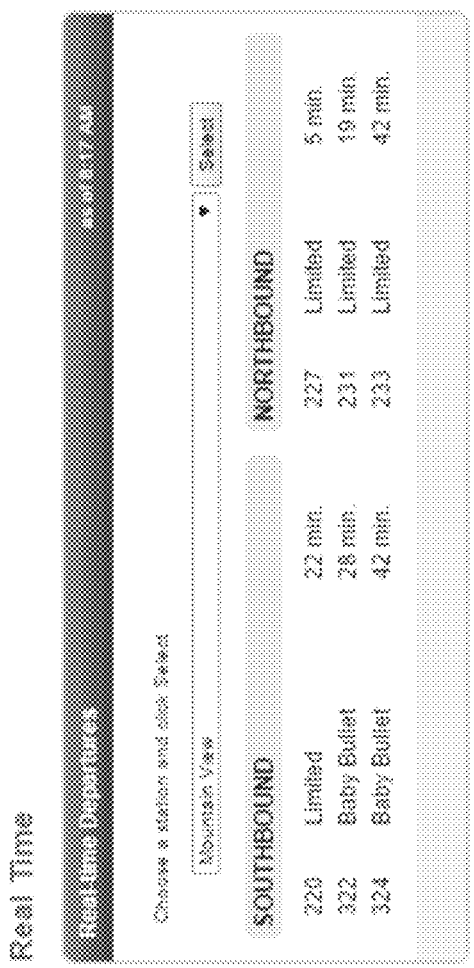

FIGS. 5A and 5B are examples of publicly available information regarding a service provider (in this example, a commuter train system) that may be downloaded by the universal interaction platform 400, according to one or more disclosed embodiments. As shown in FIG. 5A, the universal interaction platform 400 may download information from the commuter train system website including, for example, the departure times of trains from stations and the locations of each of the stations. The universal interaction platform 400 stores the downloaded information in a structured data set such that the universal interaction platform 400 is able to provide the information in response to user queries. For example, in response to a query at 7:30 am regarding the next northbound train from Mountain View, the universal interaction platform 400 is able to respond that the next northbound train is scheduled to depart from Mountain View at 7:37.

The universal interaction platform 400 may periodically download information from service providers so as to provide real-time or near real-time information to users. Referring to FIG. 5B, for example, the commuter train system website is periodically updated with predicted departure information at each of the stations within the commuter train system. The universal interaction platform 400 may, for example, periodically download the predicted departure information, store the predicted departure information as part of the structured data set, and output the predicted departure information in response to user queries. For example, in response to a user query regarding the next train to from Palo Alto to Menlo Park, the universal interaction platform 400 determines that the 231 and 233 trains stop at Menlo Park based on the information in FIG. 5A and determines that the 231 train is predicted to depart in 19 minutes based on the information in FIG. 5B.

In other instances, a service provider may maintain an application programming interface (API) that enables the universal interaction platform 400 to receive information regarding the services offered by the service provider and/or send instructions to the service provider. In this instance, the API documentation may specify the services provided by the service provider and the protocols and formats required by the service provider to request information regarding those services and/or to request those services.

FIG. 6A shows exemplary protocols and formats required to output an instruction to a service provider via an API (in this example, the ride service described above). The API may be configured to allow the universal interaction platform 400 to perform a function (i.e., request information or request a service) by outputting an instruction using a specified method to a specified endpoint with specified parameters. The methods, endpoints, and parameters may be specified in the API documentation. As shown in FIG. 6A, the ride service maintains an API that allows the universal interaction platform 400 to request, for example, a list of available services ("List products") at a particular location by specifying the longitude and latitude of the particular location and outputting an instruction to the specified endpoint (/v1/products) using the specified method (GET). The rider service API also allows the universal interaction platform 400 to request a service ("Create ride request") by outputting an instruction specifying the service (i.e., "product_id") and the start location (i.e., "start_latitude" and "start_longitude") and other optional parameters and to the specified endpoint (/v1/requests) using the specified method (POST).

An API may also specify the protocol for receiving information from the service provider and the format of the information output by the service provider. FIG. 6B shows an exemplary format of a response from a service provider (in this instance, a response from Uber to a request for a list of available services). As shown in FIG. 6B, the Uber API outputs a status code (200 OK) to indicate that the request was successfully processed and details regarding available services. In this instance, an non-luxury car ("display_name": "CarX"; "capacity": 4) and a sport utility vehicle ("display_name": "CarXL"; "capacity": 6) are available. The protocol for receiving information from the service provider and the format of the information output by the service provider may also be specified by the service provider in the API documentation.

In other instances, a smart device 160 may have an API that enables the universal interaction platform 400 to receive information stored in the smart device 160 and/or send instructions to the smart device 160 by sending and receiving an object to and from the smart device 160. The object may be, for example, in JavaScript Object Notation (JSON) format, extensible markup language (XML) format, etc. The protocol for communicating with the smart device 160 and the format of the object may be specified by the provider of the smart device 160 in the API documentation.

FIG. 7 shows an exemplary format of an object sent to and from a smart device 160 (in this example, the smart thermostat described above) to receive information from and control the smart device 160. For example, the universal interaction platform 400 may receive an object from the thermostat with the data values shown in FIG. 7, store the data shown in FIG. 7, and output the information shown in FIG. 7 in response to a query from a user regarding the thermostat. For example, if a user submits a query regarding the ambient temperature, the universal interaction platform 400 outputs a message indicating that the ambient temperature is 72 degrees Fahrenheit based on the message object received from the thermostat.

In order to control the smart thermostat, the thermostat requires an object with the same data values shown in FIG. 7 and the relevant metadata for the particular thermostat. Accordingly, in response to a request from a user to set the target temperature to 68 degrees Fahrenheit, the universal interaction platform 400 outputs an object in the format shown in FIG. 7 (with the target_temperature_f value set to 68) for transmittal to the smart device 160 via, for example, the LAN 112, the internet 111, and the LAN 112.

Figure 8:
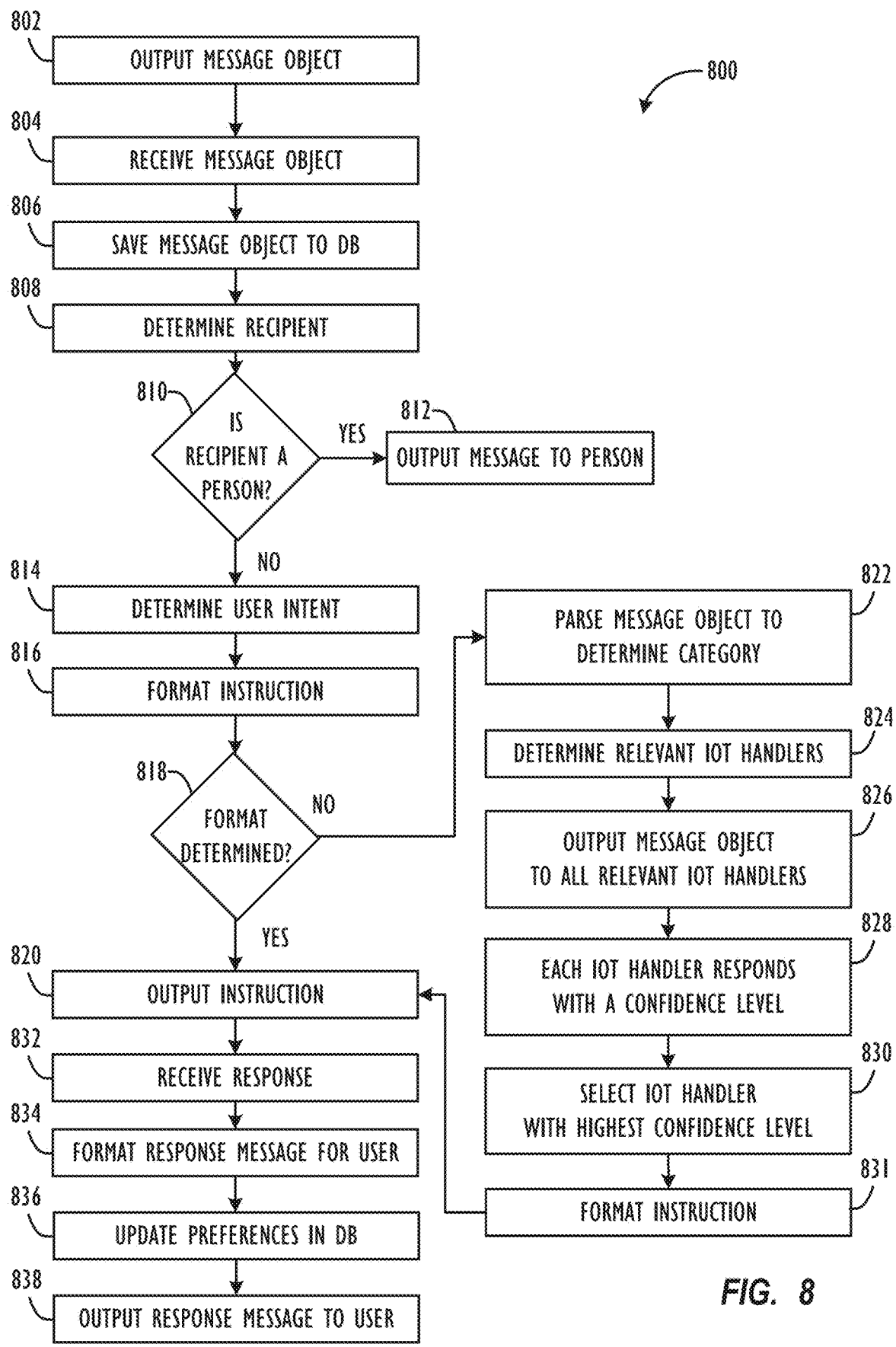
FIG. 8 shows a flowchart of a method for communicating with a smart device or a service provider, according to one or more disclosed embodiments.

FIG. 8 shows a flowchart 800 of a method for communicating with a smart device 160 or a service provider, according to one or more disclosed embodiments.

A client device 130 outputs a message object in step 802. The message object may be, for example, a universal message object in JavaScript Object Notation (JSON) format. The message object may include the body of the message input by the user, for example, via a message interface (e.g., 360, 380) and information indicative of the recipient (i.e., a smart device 160 or service provider) selected by the user via the inbox 300.

The messaging service 420 receives the message object in step 804 and saves a copy of the message in a database in step 806. The database may be stored, for example, in the storage device 122. The messaging service 420 determines the identity of the recipient in step 808. If the recipient is a person (Step 810: Yes), the messaging service 420 outputs the message to the recipient in step 812 (as described, for example, in "the Entefy personal communications patent applications, which are referenced above and incorporated by reference).

If the recipient is a smart device 160 or a service provider (Step 810: No), the natural language classifier 440 parses the message content to determine the intent of the user in step 814. The natural language classifier 440 determines user intent by making a probabilistic determination based on a large data set of information including previous messages output by the user and other users, documentation regarding the selected smart device 160 or service provider, publicly available and other natural language data sets. For each smart device 160 and service provider supported by the universal interaction platform 400, for example, the universal interaction platform 400 may store a map in the storage device 122 that associates natural language expressions previously sent by users (or that could potentially be sent by users) with user intents relevant to the smart device 160 or service provider. The natural language classifier 440 determines the user intent by finding the natural language expression that is most similar to the message sent by the user and selecting the user intent associated with the natural language expression. Using a smart thermostat (e.g., Next) as an example, an exemplary map is shown in Table 1.

TABLE 1

| User Intent | Natural Language Expression |
|---|---|
| Set target temperature to <temp> | "Set the temperature to <temp>"<br>"Set temp to <temp>"<br>"Set thermostat to <temp>"<br>"I'd like it to be <temp> in here"<br>"Make it <temp>" |
| Increase target temperature by <delta_temp> | "Increase the temperature by <delta_temp>"<br>"Make it <delta_temp> hotter"<br>"Make it <delta_temp> warmer"<br>"Bump it up <delta_temp> degrees" |

TABLE 1-continued

| User Intent | Natural Language Expression |
| --- | --- |
| Decrease target temperature by <delta_temp> | "Decrease the temperature by <delta_temp>"<br>"Make it <delta_temp> cooler"<br>"Make it <delta_temp> colder"<br>"Drop it down <delta_temp> degrees" |
| Output target temperature | "What are you set to?" |
| Output ambient temperature | "What's the temperature?" |

If, for example, the universal interaction platform 400 receives a message from a user stating "I'd like it to be 68 in my house," the natural language classifier 440 compares the message received from the user with the natural language expressions stored in the map and determines the natural language expression ("I'd like it to be <temp> in here") that is most similar to the message received from the user ("I'd like it to be 68 in my house") and selects the user intent (in this instance, to set the temperature to 68) associated with the most similar natural language expression.

The universal interaction platform 400 also determines user intent based on other factors, such as the location of the client device 130 and/or the time the message object was output by the client device 130 (or received by the server 121). Returning to the ride service example above, a user may output a message requesting a ride and the universal interaction platform 400 may determine that the user intent is to request a ride from the current location of the client device 130. Returning to the commuter train system example above, a user near may output a message asking about the next train to San Francisco. The universal interaction platform 400 may determine that the client device 130 is closest to Palo Alto and, therefore, may determine that, in this instance, the user intent is to request the departure time for the next train to San Francisco from Palo Alto. Furthermore, the universal interaction platform 400 may determine that the client device 130 is closest to Palo Alto but is not close enough for the user to board the next train to San Francisco. Accordingly, the universal interaction platform 400 may determine that the user intent, in this instance, is to request the departure time for the second train to San Francisco from Palo Alto.

The universal interaction platform 400 also determines user intent based on previous messages output by the user via the inbox 300. Accordingly, universal interaction platform 400 may also store a map of natural language expressions for a particular user. Returning to the smart thermostat example above, an exemplary map of natural language expressions for a particular user is shown in Table 2.

TABLE 2

| User Intent | Natural Language Expression |
| --- | --- |
| degrees Fahrenheit | "degrees" |
| 2 degrees Fahrenheit | "a few degrees"<br>"a bit" |
| Increase temperature by <delta_temp> | "Bump it up <delta_temp> degrees" |
| Decrease temperature by <delta_temp> | "Drop it down <delta_temp> degrees" |
| Output ambient temperature | "Is it hot in here?" |
| Increase temperature by 2 degrees F. | "I'm cold" |
| Set target temperature to 68 degrees F. | "Brian is coming over" |

If, for example, the universal interaction platform 400 receives a message from the user associated with Table 2 stating "Make it a bit warmer", the natural language classifier 440 compares the message received from the user with the natural language expressions stored in Tables 1 and 2, determines the natural language expressions ("Make it <delta_temp> warmer" and "a bit") that are most similar to the messages received from the user ("Make it a bit warmer"), and determines the intent of the user. In this example, the intent of the user to increase the temperature is found in Table 1 and the exact value of the increase is found in Table 2.

The universal interaction platform 400 develops the map of natural language expressions for a particular user based on previous messages output by the user via the inbox 300. For example, the first time a user outputs a message to the universal interaction platform 400 for transmittal to the smart thermostat and the universal interaction platform 400 cannot determine the user intent based on the map used for all users shown in Table 1 (for example, when the user says "a bit" or "I'm cold" or "Brian is coming over"), the universal interaction platform 400 may ask the user to clarify how the user would like the smart thermostat to respond and then store that user intent for future use when the user outputs another message using similar language. Returning to the ride service example above, if the user requests a ride from "Brian's house", the universal interaction platform 400 may ask "Where is Brian's house?" (or "Are you currently at Brian's house?") and then map the user's response (or the location of the client device 130) to "Brian's house" for future use.

Because there is a finite number of relevant instructions for each smart device 160 or service provider, there is a finite number of relevant user intents. Accordingly, the universal interaction platform 400 is able to map each user intent to any number of natural language expressions. The natural language classifier 440 is then able to quickly and accurately determine the user intent based on the natural language expressions used by the user.

The IoT handler 432 associated with the selected service provider or smart device 160 formats an instruction for the smart device 160 or service provider in step 816. The universal interaction platform 400 stores the formats and protocols required by each of the smart devices 160 and service providers supported by the platform in the storage device 122. Additionally, the universal interaction platform stores a map associating each of the user intents described above with a properly formatted instruction for the smart device 160 and service provider.

Using a smart thermostat again as an example, a map associating each of the user intents described above with a properly formatted instruction is shown in exemplary Table 3.

TABLE 3

| User Intent | Instruction |
| --- | --- |
| Set temperature to <temp> | target_temperature_f: <temp> |
| Increase temperature by <delta_temp> | target_temperature_f:<br>    target_temperature_f + <delta_temp> |
| Decrease temperature by <delta_temp> | target_temperature_f:<br>    target_temperature_f − <delta_temp> |
| Output target temperature | RETURN target_temperature_f |
| Output ambient temperature | RETURN ambient_temperature_f |

In the smart thermostat example above, the IoT handler 432 associated with the type of smart thermostat formats an instruction to set the temperature to 68 degrees Fahrenheit by building a JSON object with the metadata for the specific smart thermostat and the required data values (for example, device_id: peyiJNo0IldT2Y1IVtYaGQ; locale: en-US; . . . target_temperature_f: 68) and outputting the JSON object for transmittal to the thermostat.

Using the ride service again as an example, the IoT handler 432 associated with the ride service request formats an instruction to request a ride by including all of the required parameters specified in the API documentation (for example, start_latitude: 37.334381; start_longitude: −121.89432; end_latitude: 37.77703; end_longitude: −122.419571; product_id: a1111c8c-c720-46c3-8534-2fcdd730040d) and outputting the instruction to the API endpoint (/v1/requests) specified in the API documentation.

In other instances, the IoT service 430 may determine that the most probable way to interact with a service provider is to send an email to the service provider. For example, a user may input a query requesting a quote for new electric service from XYZ Electric. The universal interaction platform 400, having previously downloaded information from the XYZ website, may not have the information necessary to respond to the user query but may have determined that requests for services may be sent by email to bob@xyzelectric.com. Accordingly, the IoT Service 430 may determine that the method that will most probably return an answer to the user query is to have the messaging service 420 format an email with the fields required for that particular service provider (for example, to: bob@xyzelectric.com) and a body of the email indicative of the user intent (for example, body: "A user has requested a quote for a new electric service.") and output the email message to the service provider.

If the IoT handler 432 associated with the device 160 or service provider selected by the user is unable to format the instruction for the smart device 160 or service provider (Step 818: No), the natural language classifier 440 parses the message object (received from the user in step 804) to determine the relevant device category or service category in step 822. For example, the relevant category may be transit.

The IoT service 430 determines the IoT handlers 432 that are relevant to the device category or service category in step 824. The relevant IoT handlers 432 may be selected from among the IoT handlers 432 associated with smart devices or services set up by the user.

The IoT service 430 outputs the message object to all of the relevant IoT handlers 432 in step 826. Each of the IoT handlers 834 respond to the message object with a given confidence level that the message object is relevant to the smart device 160 or service provider associated with that IoT handler 432 in step 828. The IoT service 430 selects the IoT service 432 with the highest confidence level in step 830. The selected IoT handler 432 formats an instruction in step 831 as described above with reference to step 816.

The IoT handler 432 (or the messaging service 420) outputs the instruction for transmittal to the smart device 160 or third party service provider device 150 in step 820.

The IoT handler 432 may receive a response from the service provider device 150 or the smart device 160 in step 832. The response may be in the form of an object, an email message, an SMS message, etc. As described above with reference to FIGS. 6B and 7B, responses from service provider devices 150 and start devices 160 have a format that is known to the universal interaction platform 400. For example, the format of response messages may be specified in the API documentation. In another example, the format of response messages may be determined by parsing previous response messages from the same smart device 160 or service provider device 150. Accordingly, the universal interaction platform 400 is able to parse the response for information relevant to the user and output a message to the user. As shown in FIGS. 3C and 3E, the response message to the user is output by the universal interaction platform 400 via the multi-format, multi-protocol inbox 300 as if the response message is from the smart device 160 or service provider.

The messaging service 420 formats the response message for the user in step 834. The response message is output using natural language. The tone of the natural language may be based on user preferences stored, for example, in the storage device 122. The user preferences may specify a different tone for different services. For example, a user may specify a more formal tone (e.g., "Sir, your car has arrived" and "Thank you. We hope you enjoyed your trip") when the requested service is a luxury car and a more informal tone (e.g., "Your car is here" and "Trip complete") when the requested service is not a luxury car.

Additionally or alternatively, the tone of response messages output on behalf of a service provider or a smart device 160 may be specified by the service provider or provider of the smart device. A service provider or provider of a smart device may specify different tones for response messages based on the demographics of the user (age, gender, etc.). The preferences of the service providers and/or providers of smart devices 160 may be stored in the storage device 122.

The universal interaction platform 400 updates the user preferences in the database in step 836.

The messaging service 420 outputs the response message to the user in step 838.

AI-Driven API Analyzer

As described above, the universal interaction platform 400 outputs instructions to third party smart devices 160 and service providers to perform certain functions. The protocols and formats required by a device or service provider to perform those functions may be determined manually. Additionally or alternatively, those protocols and formats may be determined by the API analyzer 460 as described below.

Figure 9A:
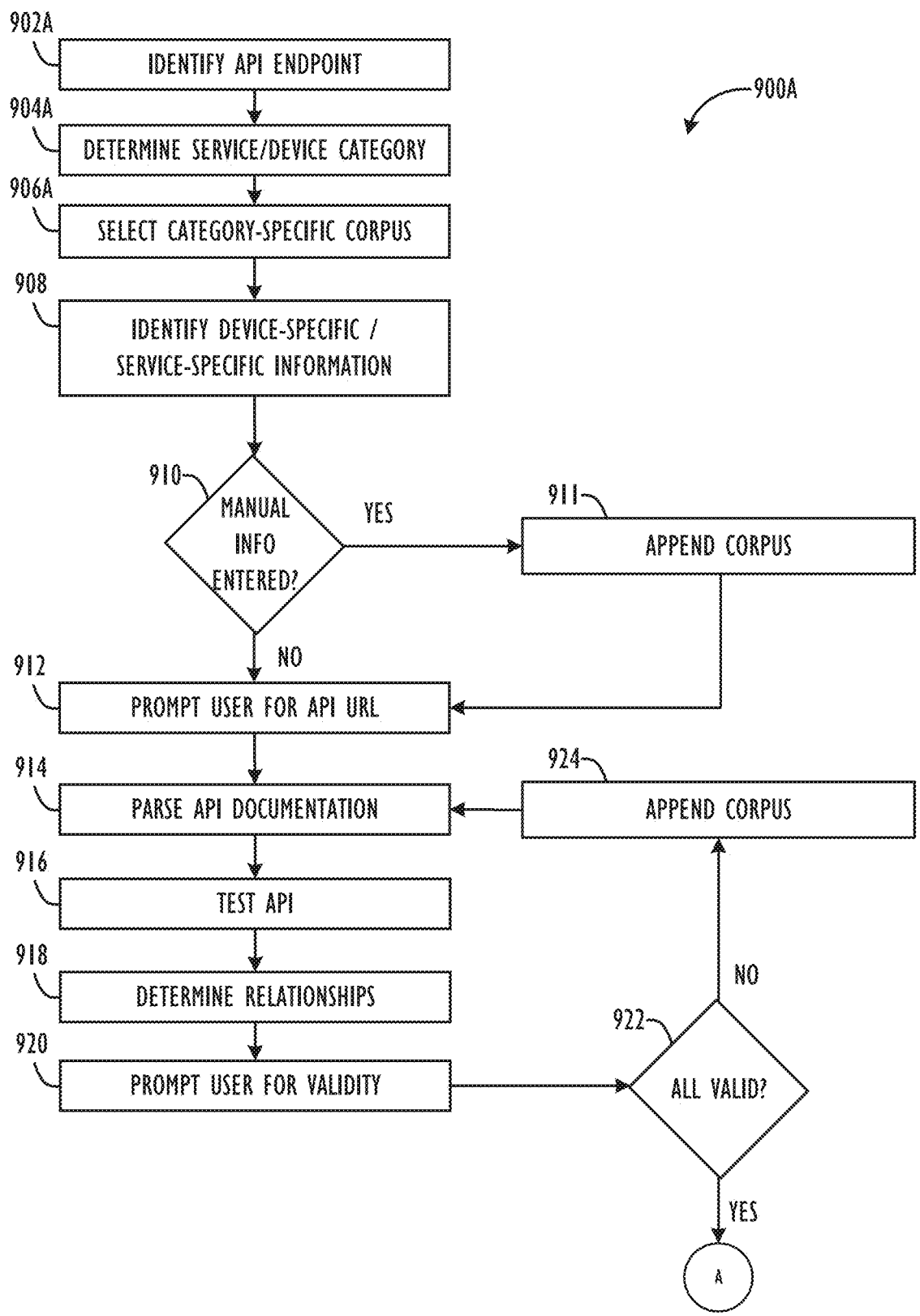
FIGS. 9A and 9B show a flowchart of a method for determining the protocols and formats required by a smart device or service provider to interact with the smart device or service provider via an API, according to one or more disclosed embodiments.
Figure 9B:
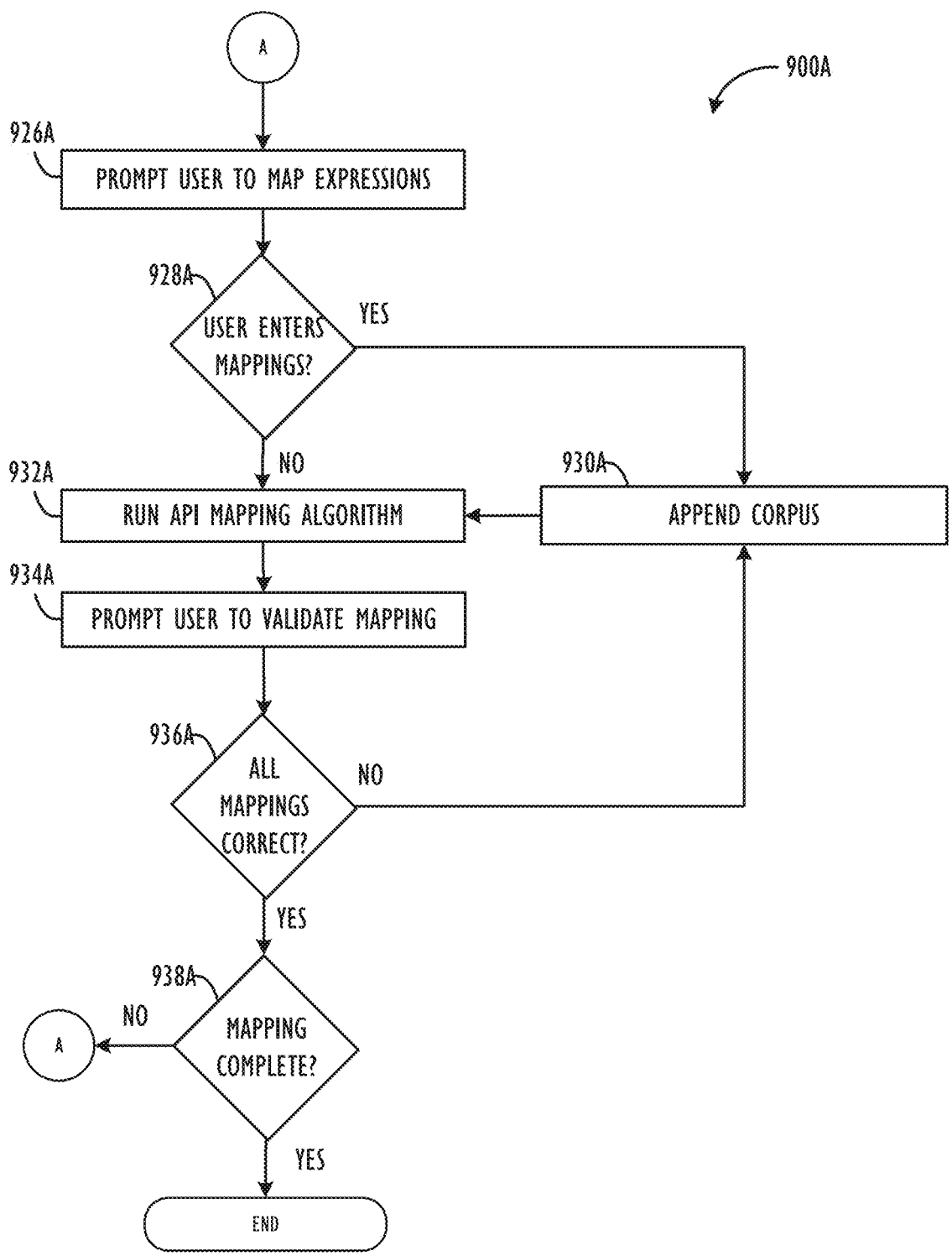

FIGS. 9A and 9B show a flowchart of a process 900*a* for determining the protocols and formats required by a smart device 160 or service provider to interact with the smart device 160 or service provider using natural language via an API, according to one or more disclosed embodiments.

An API endpoint for a service provider or smart device is identified in step 902*a*. In some instances, a user (for example, a developer for the service provider or provider of the smart device 160) may identify an API endpoint by registering a device 160 or service with the universal interaction platform 400. For example, the API analyzer 460 may include a user interface that allows a user to enter the universal resource locator (URL) of the API endpoint. In other instances, the universal interaction platform 400 may identify the API endpoint, for example by crawling the internet and identifying devices 160 or service providers to add to the universal interaction platform 400.

A service category or device category is determined in step 904*a*. For example, the service category for a ride service may be "on-demand transit" while the device category for a smart thermostat may be "appliance" or "smart home." The service category or device category may be selected by the user. For example, the API analyzer 460 may include a user interface that allows a user to select the device category or service category. Additionally or alternatively, the natural language classifier 440 may determine a device category or service category by analyzing documentation (e.g., a website and/or API documentation) regarding the service provider or smart device 160.

A category-specific corpus is selected in step 906a based on the service category or device category determined in step 904a. A corpus is a collection of information about the words and phrases of a language and about the lexical categories to which those words belong. The API analyzer 460 may store a category-specific corpus for each of a plurality of potential service categories and device categories in the storage device 122. For each word and/or phrase in the category-specific corpus, the category-specific corpus may include, for example, definitions, parts of speech, synonyms, lexical connections to other words or phrases, etc. The category-specific corpus may also include weighted probabilities that each word or phrase in the category-specific corpus is related to other words or phrases in the category-specific corpus. As additional service providers and smart devices 160 are added to the universal interaction platform 400 over time, the category-specific corpuses may be modified to include additional words and phrases that are relevant to that particular category. The API analyzer 460 may also store a global corpus that may be used for all smart devices 160 and service providers or for the smart devices 160 and service providers that are unrelated to the category-specific corpuses.

As described in detail below, the API analyzer 460 forms a service-specific or device-specific corpus by appending the category-specific corpus (or global corpus) to include words or phrases relevant to the specific smart device 160 or service.

The user is prompted to manually identify service-specific or device-specific information in step 908. Service-specific or device-specific information may include words or phrases that are relevant to the specific service or smart device 160. The API analyzer 460 may enable the user, for example, to manually describe service-specific or device-specific words or phrases, to upload a service-specific or device-specific dictionary, to identify an object (e.g., a JSON object, an XML object, etc.) that is relevant to the service-specific or device-specific API, etc. If the user manually identifies service-specific or device-specific information (Step: 910: Yes), the API analyzer 460 appends the category-specific corpus (selected in step 906a) to include the service-specific or device-specific information in step 911. Because the category-specific corpus may be appended to include service-specific or device-specific information, it is referred to below as a service-specific or device-specific corpus.

The user is prompted to enter a URL of API documentation in step 912. The API analyzer 460 parses the API documentation in step 914. The API analyzer 460 may determine, for example, the functions available via the API, and the API endpoints, methods, and parameters required to request those functions (as shown, for example, in FIG. 6A). If the API requires that an object (as shown, for example, in FIG. 7) be output to a smart device 160 or service provider device 150, the API analyzer 460 may determine, for example, the data values of the object, whether a function may be performed by changing one or more of the data values, etc.

The API analyzer 460 tests the API in step 916. Because the API documentation parsed in step 914 may be incomplete or inaccurate, the API analyzer 460 may determine, for example, whether the API may be used to perform additional functions (for example, by including different parameters than are identified in the API documentation). The API analyzer 460 may also receive and parse response messages received from the API.

The API analyzer 460 uses the service-specific or device-specific corpus described above to make probabilistic determinations of the relationships between words and phrases related to the service provider or smart device 160 (e.g., words or phrases used in the API documentation, the API endpoints, the API parameters, the data values of the object, etc.) in step 918. For example, the API analyzer 460 may determine whether a word or phrase is a subset of another word or phrase, whether those words or phrases are synonymous, whether those words or phrases are unrelated, etc.

The API analyzer 460 may prompt the user to verify the previous determinations in step 920. For example, the API analyzer 460 may display the API endpoints, methods, and parameters identified in step 914 via a graphical user interface and prompt the user to confirm whether those API endpoints, methods, and parameters are accurate and complete. The API analyzer 460 may also prompt the user to verify whether the relationships between words and phrases determined in step 918 are accurate. (For example, one API endpoint identified in step 914 may be /calendars/{calendarId}/events/{eventId}. Based on the API endpoint, the API analyzer 460 may determine that 'event' (or 'events') is not synonymous with 'calendar' or 'calendars' but is instead a separate referencable object. However, the API analyzer 460 may determine that there still exists a probability that 'calendar' and 'events' refer to the same thing. Accordingly, the API analyzer 460 may prompt the user to verify the previous determination that 'calendar' and 'events' are not synonymous but rather are a separate referencable objects.)

If the user indicates that one or more of the previous determinations were invalid (Step 922: No), the API analyzer 460 appends the service-specific or device-specific corpus in step 924 and returns to step 914. The API analyzer 460 may then re-parse the API documentation to determine API functions, endpoints, methods, and parameters (step 914), re-test the API (step 916, if necessary), make additional determinations regarding the relationships between words and phrases related to the service provider or smart device 160 (step 918) and prompt the user to verify the additional determinations (step 920) with the additional information in the device-specific or service-specific corpus.

In step 926a, the API analyzer 460 prompts the user to identify natural language expressions (i.e., instructions and/or queries) that are relevant to the smart device 160 or service provider (as described above, for example, with reference to Table 1) and the API functions and parameters necessary for the smart device 160 or service provider to respond to those instructions or queries (as described above, for example with reference to Table 3).

If the user maps API functions and parameters with natural language expressions (Step 928a: Yes) the API analyzer 460 appends the device-specific or service-specific corpus in step 930a.

In step 932a, the API analyzer 460 maps additional natural language expressions to the API functions and parameters identified in step 914. The additional natural language expressions may be identified by parsing the device-specific or service-specific corpus. The additional natural language expressions may also be natural language expressions that were previously determined to be relevant to the same category of smart device 160 or service provider. Additionally, the additional natural language expressions may be identified based on messages sent by users via the universal interaction platform 400. For example, the universal interaction platform 400 may store messages sent to other users, services or smart devices 160, categorize each message as relevant to certain categories of services or smart devices 160, and identify potentially-relevant natural language expressions from the messages that were identified as relevant to the category of services or smart devices 160. (For the purposes of determining potentially-relevant natural language expressions, the messages are stored without personally identifiable information.)

In step 934a, the API analyzer 460 prompts the user to validate the API mapping performed in step 932a. If any of the mappings were invalid (Step 936a: No), the API analyzer 460 appends the device-specific or service-specific corpus in step 930a and re-runs the API mapping algorithm with the additional information in step 932a. The API analyzer 460 also prompts the user to validate that the API mapping is complete in step 934a. If the user wishes to map additional natural language expressions to API functions (Step 938a: No), the process returns to step 926a. Otherwise (step 938a: Yes), the process is complete.

Figure 9C:
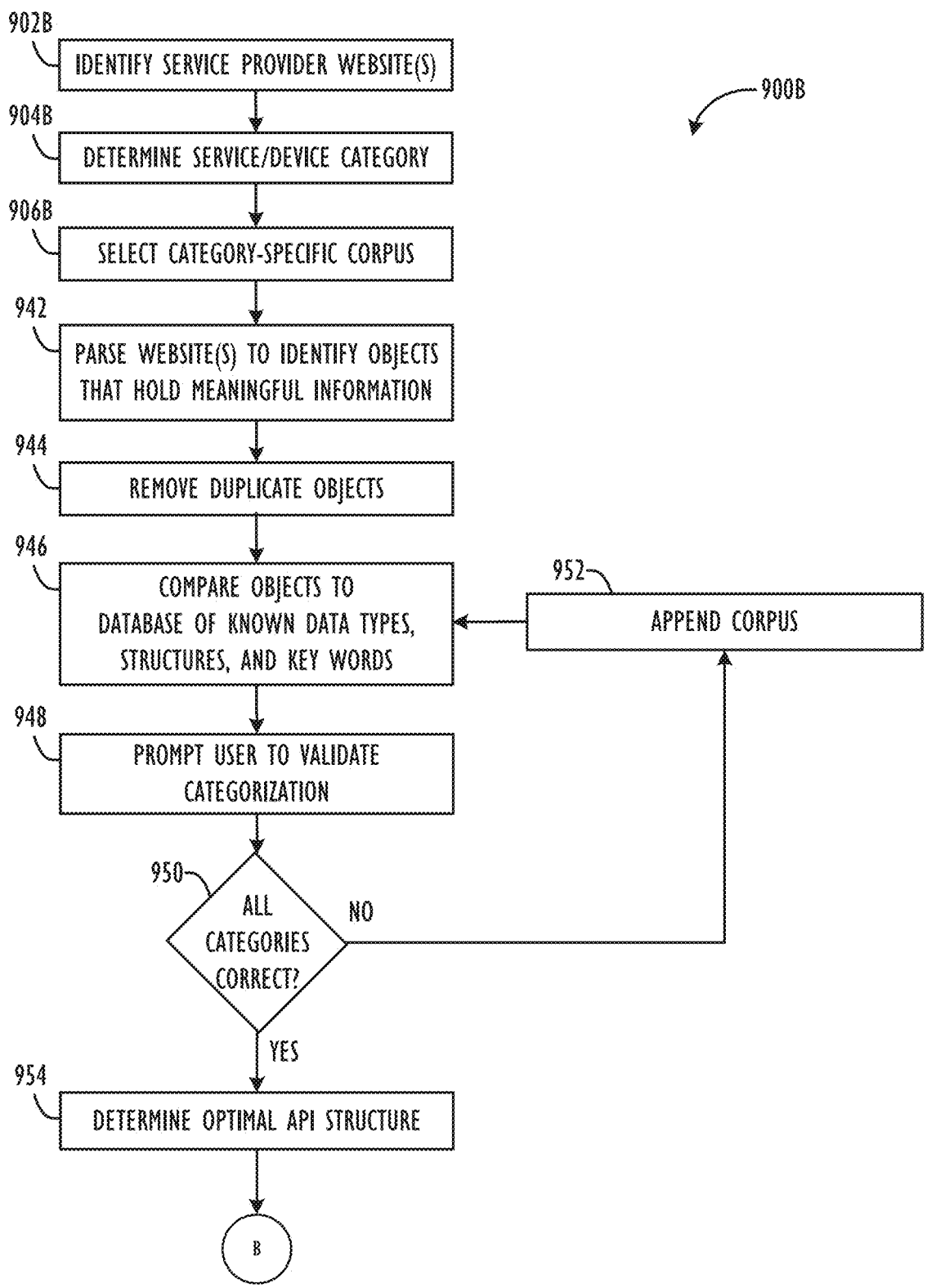
FIGS. 9C and 9D show a flowchart of a process for determining the protocols and formats to obtain information regarding a service provider that provides the information in an unstructured format or in an unknown structure, according to one or more disclosed embodiments.
Figure 9D:
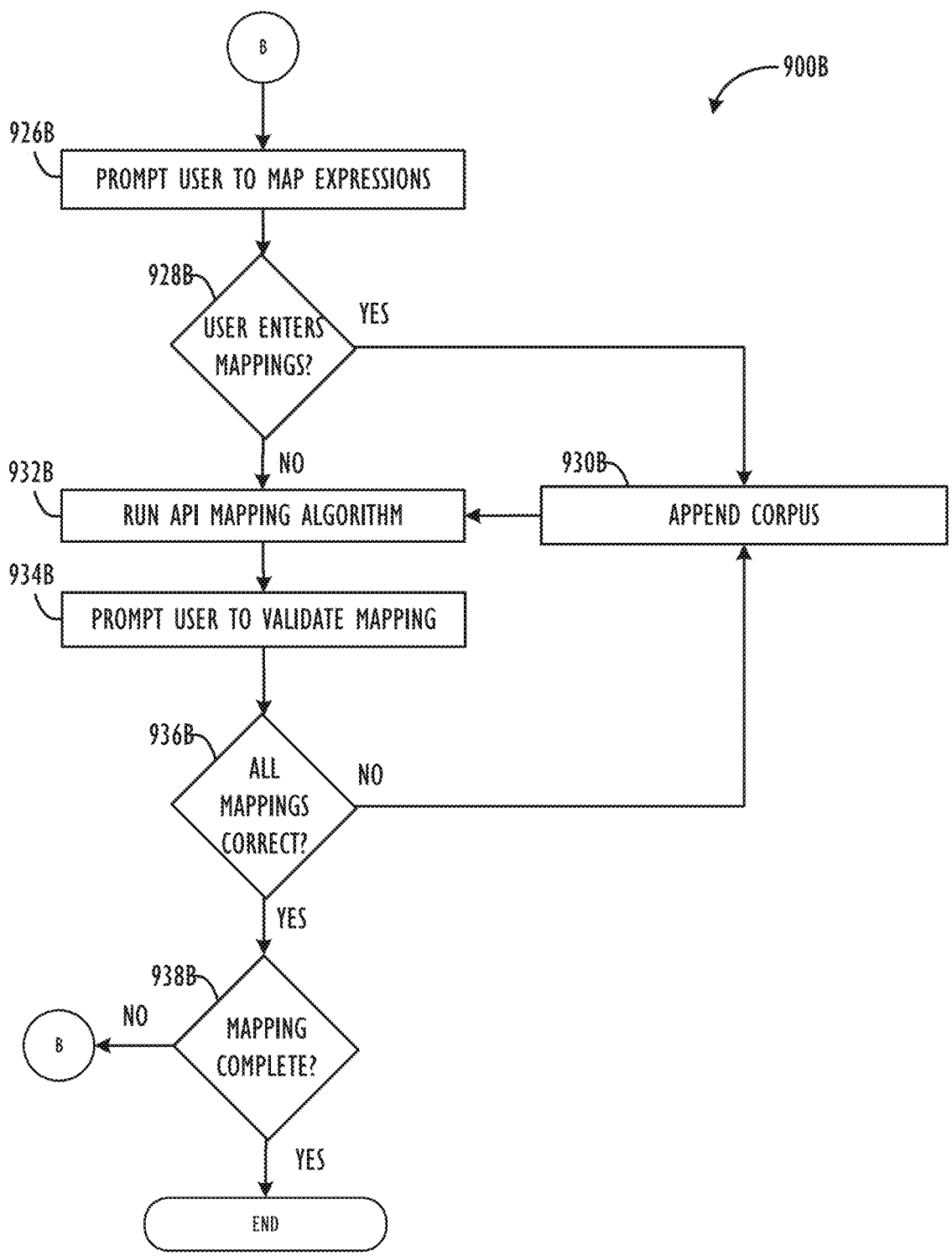

FIGS. 9C and 9D show a flowchart of a process 900b for determining the protocols and formats to obtain information regarding a service provider that provides the information in an unstructured format or in an unknown structure, according to one or more disclosed embodiments. The process 900b may be used, for example, when a service provider does not maintain an API. The process 900b includes operations that are similar to the process 900a, which are referred to using like numbers.

Websites that describe the services provided by a service provider website are identified in step 902b. The websites may include the service provider website, a third party review website describing the service provider, etc. In some instances, a user (for example, the service provider) may identify the service provider websites via a user interface. In other instances, the universal interaction platform 400 may identify the service provider websites, for example by crawling the internet and identifying service providers to add to the universal interaction platform 400.

A service category is determined (for example, by user selection or by the API analyzer 460 parsing the service provider websites) in step 904b. A category-specific corpus is selected in step 906b based on the service category determined in step 904b. The category-specific corpus is appended to form a service-specific corpus as described below.

The API analyzer 460 parses the content of the service provider websites to extract distinct objects that hold potentially meaningful information in step 942. (If a service provider website says, for example, "We are available from 9 am to 10 pm at 215-569-5500 with friendly service" the API analyzer 460 may determine that '9 am,' 10 pm' and '215-569-5500' are potentially meaningful whereas "with friendly service" is not an object that includes potentially meaningful information.) The meaningful information may include any information relevant to the service provider or the services offered by the service provider. For example, the API analyzer 460 may parse a restaurant website and extract objects that include information regarding the service provider such as the name, address, telephone number, reviews, hours of operation, etc. as well as objects that include information regarding the services, such as the title, description, and price of each menu item. In the commuter train system example described above with reference to FIGS. 5A and 5B, the API analyzer 460 may parse the commuter train system website and extract objects that include the name and address of each station, the name of each train, and the departure times for each train, etc. The API analyzer 460 stores the objects, for example, in the storage device 122. Each time the API analyzer 460 determines that a distinct object on the service provider websites includes relevant information, the API Analyzer 460 may store the location of that object so that the API analyzer 460 can periodically re-parse the service provider websites and quickly and easily update the information stored in the storage device 122.

The API analyzer 460 removes duplicate objects in step 944. The service provider websites may list certain information (for example, an address or phone number) in more than one location. Additionally, some of the same information may be included in both a service provider website and a third-party review website. Accordingly, the API analyzer 460 eliminates the duplicate objects.

The API analyzer 460 determines a probably category for each object by comparing the objects to a database of known data types, structures, and/or keywords in step 946. In the example above, the API analyzer 460 may compare the object '215-569-5500' to the database of known data types, structures, and/or keywords and determine based on the comparison to the database that the most probable category of that object is a phone number.

The API analyzer 460 may prompt the user to validate the categorization of each object in step 948. In the example above, the API analyzer 460 may prompt the user to confirm that '215-569-5500' is a phone number. If the user indicates that any of the categorizations are incorrect (Step 950: No), the service-specific corpus is appended to include this additional information in step 952 and the API analyzer returns to step 946 and re-categorizes the objects.

Once the user indicates that all of the categorizations are correct (Step 950: Yes), the API analyzer 460 determines an optimal API structure in step 954 for users to query the dataset of information regarding the service provider. The optimal API structure is a map linking the objects extracted from the service provider websites with queries for returning that meaningful information. The queries and the objects may have a many-to many relationship. Using the example above, the map may include the example queries and the objects as shown in Table 4.

TABLE 4

| Query | Object(s) |
|---|---|
| getPhoneNumber( ) | 215-569-5500 |
| getAddress( ) | One Logan Square |
|  | 130 North 18th Street |
|  | Philadelphia, PA 19103-6998 |
| getBusinessInfo( ) | Blank Rome LLP |
|  | One Logan Square |
|  | 130 North 18th Street |
|  | Philadelphia, PA 19103-6998 |
|  | 215-569-5500 |

Using the commuter train system example described above with reference to FIGS. 5A and 5B, the optimal API structure may include queries and parameters. For example, one query may be 'getDepartureTimes(startingStation, direction, currentTime)' where the query is a request for the departure times based on parameters that include the departure station ('startingStation'), the direction of travel ('direction') and the current time ('currentTime'). In another example, a query may be 'getTransitTime(startingStation, endingStation, currentTime)' where the query is a request for a travel time between a departure station and a destination ('endingStation') with an additional parameter of the current time used to identify the next available train to use when calculating the travel time.

The API analyzer 460 may determine the optimal API structure by comparing the dataset for the service provider to other API structures within the universal interaction platform 400 and selecting an API structure (for example, an API structure developed by a third party developer) that is used to output similar types of data. If none of the API structures within the universal interaction platform 400 are used to output similar types of data, the API analyzer 460 may simply store each object separately and create a separate query to return each of the objects. If the universal interaction platform 400 includes multiple APIs that are used to output similar types of data, the API analyzer 460 may select the API structure that is most commonly used to output similar types of data. The universal interaction platform 400 may also include an internal rating of some or all of the API structures and the API analyzer 460 may select the highest rated API structure from among the API structures that are used for similar types of data.

As described above with reference to FIG. 9C, the API analyzer 460 extracts information regarding a service provider—information that may be in an unstructured format or in an unknown structure—and organizes that information in a structured format similar to the API structures developed by third parties as described above with reference to FIGS. 9A and 9B. The remaining steps of the process 900b, which are shown in FIG. 9D, as similar to the process 900a, except that the process 900a maps natural language expressions to functions available via a third party API whereas the process 900b maps natural language expressions to queries identified by the API analyzer 460 in step 954.

In step 926b, the API analyzer 460 prompts the user to map the queries identified by the API analyzer 460 in step 954 with natural language expressions (i.e., queries). Using the examples in Table 4 above, the map may include the example mappings shown in Table 5.

TABLE 5

| Query | Natural Language Expression |
|---|---|
| getPhoneNumber( ) | What is the phone number? |
| getAddress( ) | What is the address? |

Using the commuter train system example described above, the map may include the example mappings shown in Table 6.

TABLE 6

| Query | Natural Language Expression |
|---|---|
| getDepartureTimes(Palo Alto, North, currentTime) | When are the next northbound train from Palo Alto? |
| getTransitTime(Palo Alto, San Francisco, currentTime) | How long will it take to get from Palo Alto to San Francisco? |

If the user maps API functions and parameters with natural language expressions (Step 928b: Yes) the API analyzer 460 appends the service-specific corpus in step 930b.

In step 932b, the API analyzer 460 maps additional natural language expressions to the queries identified by the API analyzer 460 in step 954. The additional natural language expressions may be identified by parsing the service-specific corpus. The additional natural language expressions may also be natural language expressions that were previously determined to be relevant to the same category of service provider. Additionally, the additional natural language expressions may be identified based on messages sent by users via the universal interaction platform 400. For example, the universal interaction platform 400 may store messages sent to other users, services or smart devices 160, categorize each message as relevant to certain categories of service providers, and identify potentially-relevant natural language expressions from the messages that were identified as relevant to the category of service providers. (For the purposes of determining potentially-relevant natural language expressions, the messages are stored without personally identifiable information.)

In step 934b, the API analyzer 460 prompts the user to validate the mappings performed in step 932b. If any of the mappings were invalid (Step 936b: No), the API analyzer 460 appends the service-specific corpus in step 930b and re-runs the API mapping algorithm with the additional information in step 932b. The API analyzer 460 also prompts the user to validate that the API mapping is complete in step 934b. If the user wishes to map additional natural language expressions to API functions (Step 938b: No), the process returns to step 926b. Otherwise (step 938b: Yes), the process is complete.

EXAMPLES

The following examples pertain to further embodiments.

Example 1 is a computer-implemented method of determining protocols and formats to interact with a service provider or smart device via an application program interface (API), comprising: identifying an API endpoint for the service provider or smart device; determining a service category or device category for the service provider or smart device; selecting a category-specific corpus based on the service category or device category; forming a service-specific or device-specific corpus by appending information regarding the service provider or smart device to the category-specific corpus; parsing API documentation to determine functions available via the API and parameters required to request the functions available via the API; and mapping the functions and parameters to natural language expressions.

Example 2 includes the subject matter of example 1, wherein the API endpoint and the service category or device category are determined based on user input.

Example 3 includes the subject matter of example 1, further comprising: prompting a user to manually input information regarding the service provider or smart device; and appending the information manually input by the user to the service-specific or device-specific corpus.

Example 4 includes the subject matter of example 1, further comprising: determining relationships between words or phrases included in the API documentation; prompting a user to validate the relationships between the words or phrases included in the API documentation; and appending the service-specific or device-specific corpus based on the user validation.

Example 5 includes the subject matter of example 1, wherein mapping the functions and parameters to natural language expressions comprises: prompting a user to map one or more of the functions and parameters to natural language expressions; appending the service-specific or device-specific corpus based on the user mapping; and mapping additional functions and parameters to natural language expressions or mapping the one or more functions and parameters to additional natural language expressions.

Example 6 includes the subject matter of example 1, wherein mapping the functions and parameters to natural language expressions further comprises: prompting a user to validate the mappings of the functions and parameters to natural language expressions.

Example 7 is an application program interface (API) analyzer, comprising: one or more storage devices that store a plurality of category-specific corpuses; a user-interface; one or more processing units that: identify an API endpoint for the service provider or smart device; determine a service category or device category for the service provider or smart device; select one of the category-specific corpuses based on the service category or device category; form a service-specific or device-specific corpus by appending information regarding the service provider or smart device to the category-specific corpus; store the service-specific or device-specific corpus in the one or more storage devices; parse API documentation to determine functions available via the API and parameters required to request the functions available via the API; map the functions and parameters to natural language expressions; store the mappings in the one or more storage devices.

Example 8 includes the subject matter of example 7, wherein the one or more processing units: prompt a user to manually input information regarding the service provider or smart device via the graphical user interface and append the information manually input by the user to the service-specific or device-specific corpus; determine relationships between words or phrases included in the API documentation, prompt the user to validate the relationships between the words or phrases included in the API documentation via the graphical user interface, and append the service-specific or device-specific corpus based on the user validation; or map the functions and parameters to natural language expressions by prompting a user to map one or more of the functions and parameters to natural language expressions via the graphical user interface, appending the service-specific or device-specific corpus based on the user mapping, and mapping additional functions and parameters to natural language expressions or maps the one or more functions and parameters to additional natural language expressions.

Example 9 includes the subject matter of example 7, wherein the one or more processing units: prompt a user to validate the mappings of the functions and parameters to natural language expressions via the graphical user interface.

Example 10 is a non-transitory computer readable storage medium (CRSM) comprising computer executable instructions stored thereon to cause one or more processing units to: identify an application program interface (API) endpoint for the service provider or smart device; determine a service category or device category for the service provider or smart device; select a category-specific corpus based on the service category or device category; form a service-specific or device-specific corpus by appending information regarding the service provider or smart device to the category-specific corpus; parse API documentation to determine functions available via the API and parameters required to request the functions available via the API; and map the functions and parameters to natural language expressions.

Example 11 includes the subject matter of example 10, wherein the API endpoint and the service category or device category are determined based on user input.

Example 12 includes the subject matter of example 10, wherein the instructions further cause the one or more processing units to: prompt a user to manually input information regarding the service provider or smart device; and append the information manually input by the user to the service-specific or device-specific corpus.

Example 13 includes the subject matter of example 10, wherein the instructions further cause the one or more processing units to: determine relationships between words or phrases included in the API documentation; prompt a user to validate the relationships between the words or phrases included in the API documentation; and append the service-specific or device-specific corpus based on the user validation.

Example 14 includes the subject matter of example 10, wherein the instructions further cause the one or more processing units to map the functions and parameters to natural language expressions by: prompting a user to map one or more of the functions and parameters to natural language expressions; appending the service-specific or device-specific corpus based on the user mapping; and mapping additional functions and parameters to natural language expressions or mapping the one or more functions and parameters to additional natural language expressions.

Example 15 includes the subject matter of example 10, wherein the instructions further cause the one or more processing units to: prompt a user to validate the mappings of the functions and parameters to natural language expressions.

Example 16 is another non-transitory computer readable storage medium (CRSM) comprising computer executable instructions stored thereon to cause one or more processing units to: identify service provider websites; determine a service category for the service provider; select a category-specific corpus based on the service category; form a service-specific corpus by appending information regarding the service provider to the category-specific corpus; parse the service provider websites to extract objects that include meaningful information regarding the service provider or services offered by the service provider; categorize each of the extracted objects by comparing the extracted objects to a database of known data types, structures, and/or keywords and associating each of the extracted objects with a category; map each of the extracted objects to one or more queries; and map each of the queries to natural language expressions.

Example 17 includes the subject matter of example 16, wherein the service provider websites are determined based on user input.

Example 18 includes the subject matter of example 16, wherein the instructions further cause the one or more processing units to prompt a user validate the categorization of each of the extracted objects.

Example 19 includes the subject matter of example 16, wherein the instructions cause the one or more processing units to map each of the queries to natural language expressions by: prompting a user to map one or more of the queries to natural language expressions; appending the service-specific corpus based on the user mapping; and mapping additional queries to natural language expressions or map the one or more queries to additional natural language expressions.

Example 20 includes the subject matter of example 16, wherein the instructions further cause the one or more processing units to: prompt a user to validate the mappings of the queries to the natural language expressions.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A computer-implemented method of determining protocols and formats to interact with a service provider or smart device via an application program interface (API), the method comprising:
   identifying an API endpoint for the service provider or smart device;
   determining a service category or device category for the service provider or smart device;
   selecting a category-specific corpus based on the service category or device category;
   parsing API documentation to determine functions available via the API and parameters required to request the functions available via the API;
   mapping one or more queries or instructions to one or more of the functions and parameters by an API analyzer; and
   forming a service-specific or device-specific corpus by appending the category-specific corpus to include the functions available via the API, the parameters required to request the functions, and the one or more queries or instructions mapped to the functions and parameters.

2. The method of claim 1, wherein the API endpoint and the service category or device category are determined based on user input.

3. The method of claim 1, further comprising:
   prompting a user to manually input information regarding the service provider or smart device; and
   appending the information manually input by the user to the service-specific or device-specific corpus.

4. The method of claim 1, further comprising:
   determining relationships between words or phrases included in the API documentation;
   prompting the user to validate the relationships between the words or phrases included in the API documentation; and
   appending the service-specific or device-specific corpus based on the user validation.

5. The method of claim 1, wherein the queries or instructions mapped to the functions and parameters are natural language expressions.

6. The method of claim 1, further comprising:
   prompting a user to validate the mappings of the API analyzer.

7. An application program interface (API) analyzer, comprising:
   one or more storage devices that store a plurality of category-specific corpuses;
   a user-interface;
   one or more processing units that:
      identify an API endpoint for a service provider or smart device;
      determine a service category or device category for the service provider or smart device;
      select one of the category-specific corpuses based on the service category or device category;
      parse API documentation to determine functions available via the API and parameters required to request the functions available via the API;
      map one or more of the functions and parameters to one or more queries or instructions;
      forming a service-specific or device-specific corpus by appending the category-specific corpus to include the functions available via the API, the parameters required to request the functions, and the one or more queries or instructions mapped to the functions and parameters; and
      store the service-specific or device-specific corpus in the one or more storage devices.

8. The API analyzer of claim 7, wherein the one or more processing units:
   prompt a user to manually input information regarding the service provider or smart device via the user-interface;
   append the information manually input by the user to the service-specific or device-specific corpus;
   determine relationships between words or phrases included in the API documentation;
   prompt the user to validate the relationships between the words or phrases included in the API documentation via the user-interface; and
   append the service-specific or device-specific corpus based on the user validation.

9. The API analyzer of claim 7, wherein the queries or instructions are natural language expressions.

10. A non-transitory computer readable storage medium (CRSM) comprising computer executable instructions stored thereon to cause one or more processing units to:
    identify an application program interface (API) endpoint for a service provider or smart device;
    determine a service category or device category for the service provider or smart device;
    select a category-specific corpus based on the service category or device category;
    parse API documentation to determine functions available via the API and parameters required to request the functions available via the API;
    map one or more queries or instructions to one or more of the functions and parameters; and
    form a service-specific or device-specific corpus by appending the category-specific corpus to include the functions available via the API, the parameters required to request the functions, and the one or more queries or instructions mapped to the functions and parameters.

11. The CRSM of claim 10, wherein the API endpoint and the service category or device category are determined based on user input.

12. The CRSM of claim 10, wherein the instructions further cause the one or more processing units to:

prompt a user to manually input information regarding the service provider or smart device; and append the information manually input by the user to the service-specific or device-specific corpus.

13. The CRSM of claim 10, wherein the instructions further cause the one or more processing units to:

determine relationships between words or phrases included in the API documentation;

prompt the user to validate the relationships between the words or phrases included in the API documentation; and append the service-specific or device-specific corpus based on the user validation.

14. The CRSM of claim 10, wherein the queries or instructions are natural language expressions.

15. The CRSM of claim 10, wherein the instructions further cause the one or more processing units to:

prompt a user to validate the mappings of the one or more processing units.

16. A non-transitory computer readable storage medium (CRSM) comprising computer executable instructions stored thereon to cause one or more processing units to:

identify service provider websites;

determine a service category for the service provider;

select a category-specific corpus based on the service category;

parse the service provider websites to extract objects that include meaningful information regarding the service provider or services offered by the service provider;

categorize each of the extracted objects by comparing the extracted objects to a database of known data types, structures, and/or keywords and associating each of the extracted objects with a category;

map each of the extracted objects to one or more queries;

form a service-specific corpus by appending the category-specific corpus to include the extracted objects and the one or more queries mapped to each of the extracted objects;

provide functionality for a user to submit one of the one or more queries; and output the extracted object mapped to the query submitted by the user.

17. The CRSM of claim 16, wherein the service provider websites are determined based on user input.

18. The CRSM of claim 16, wherein the instructions further cause the one or more processing units to prompt the user validate the categorization of each of the extracted objects.

19. The CRSM of claim 16, wherein:

the instructions cause the one or more processing units to map one or more queries to one or more natural language expressions; and the one or more processing units provide functionality for the user to submit one of the one or more queries using one of the one or more natural language expressions.

20. The CRSM of claim 16, wherein the instructions further cause the one or more processing units to:

prompt a user to validate the mappings of the one or more processing units.

* * * * *